United States Patent
Tsubota et al.

(10) Patent No.: US 10,461,645 B2
(45) Date of Patent: *Oct. 29, 2019

(54) POWER SUPPLY SYSTEM, DC/DC CONVERTER, AND POWER CONDITIONER FOR SUPPRESSING PERFORMANCE DEGRADATION IN SOLAR CELLS

(71) Applicant: OMRON Corporation, Kyoto (JP)

(72) Inventors: Yasuhiro Tsubota, Moriyama (JP); Kenji Kobayashi, Moriyama (JP); Takuji Kumagai, Kusatsu (JP); Naoki Maki, Ritto (JP); Kazumi Tsuchimichi, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/821,758

(22) Filed: Nov. 23, 2017

(65) Prior Publication Data

US 2018/0234018 A1 Aug. 16, 2018

(30) Foreign Application Priority Data

Feb. 15, 2017 (JP) ................. 2017-026424

(51) Int. Cl.
*H02J 3/38* (2006.01)
*H02M 3/335* (2006.01)
(Continued)

(52) U.S. Cl.
CPC ............. *H02M 3/335* (2013.01); *H02J 3/383* (2013.01); *H02M 7/537* (2013.01); *H02S 40/32* (2014.12);
(Continued)

(58) Field of Classification Search
CPC ........ H02M 3/335; H02M 1/00; H02M 7/537; H02M 2001/0048; H02S 40/32
See application file for complete search history.

(56) References Cited

U.S. PATENT DOCUMENTS 7,479,774 B2 * 1/2009 Wai ................. H02J 3/383
323/222
2017/0331294 A1 * 11/2017 Yu .................. H02M 3/335
(Continued)

FOREIGN PATENT DOCUMENTS

| CN | 103248007 | 8/2013 |
| CN | 203166494 | 8/2013 |

(Continued)

OTHER PUBLICATIONS

Kato, "What is PID which output drops by about 70% in one year ?" Mega-solar business, published on Jan. 7, 2016, retrieved from http://techon.nikkeibp.co.jp/atcl/feature/15/302961/010500010/?ST=msb_print on Sep. 8, 2017.

(Continued)

*Primary Examiner* — Yusef A Ahmed
*Assistant Examiner* — Jye-June Lee
(74) *Attorney, Agent, or Firm* — JCIPRNET

(57) ABSTRACT

A power supply system for recovering degraded performance of a solar cell due to PID is provided. The power supply system includes a solar cell, a non-isolated type DC/DC converter that boosts a DC voltage from the solar cell input from an input end with a predetermined boosting ratio and outputs a DC voltage from an output end, and an inverter that converts a DC voltage output from the output end of the DC/DC converter into an AC voltage, the power supply system being connected to an external power system for system interconnection, wherein the power supply system includes a potential adjustment device for applying a voltage of an external power system to the solar cell via the inverter to set a ground potential of a negative electrode of the solar cell to positive when an output of the solar cell is smaller than a predetermined value.

14 Claims, 21 Drawing Sheets

(51) Int. Cl.
  *H02S 40/32* (2014.01)
  *H02M 7/537* (2006.01)
  *H02M 1/00* (2006.01)

(52) U.S. Cl.
  CPC ...... *H02M 1/00* (2013.01); *H02M 2001/0048* (2013.01); *Y02E 10/563* (2013.01)

(56) References Cited

U.S. PATENT DOCUMENTS

2018/0062502 A1\* 3/2018 Kim .................. H02S 40/30
2018/0083547 A1\* 3/2018 Tsubota ............. H02S 40/32

FOREIGN PATENT DOCUMENTS

| CN | 103475271 | | 4/2016 |
| CN | 104242349 | | 9/2016 |
| JP | 2017011956 | | 1/2017 |
| JP | 2018129949 A | \* | 8/2018 |
| WO | WO-2019043996 A1 | \* | 3/2019 |

OTHER PUBLICATIONS

"Search Report of Europe Counterpart Application", dated Jun. 29, 2018, p. 1-p. 11.

\* cited by examiner

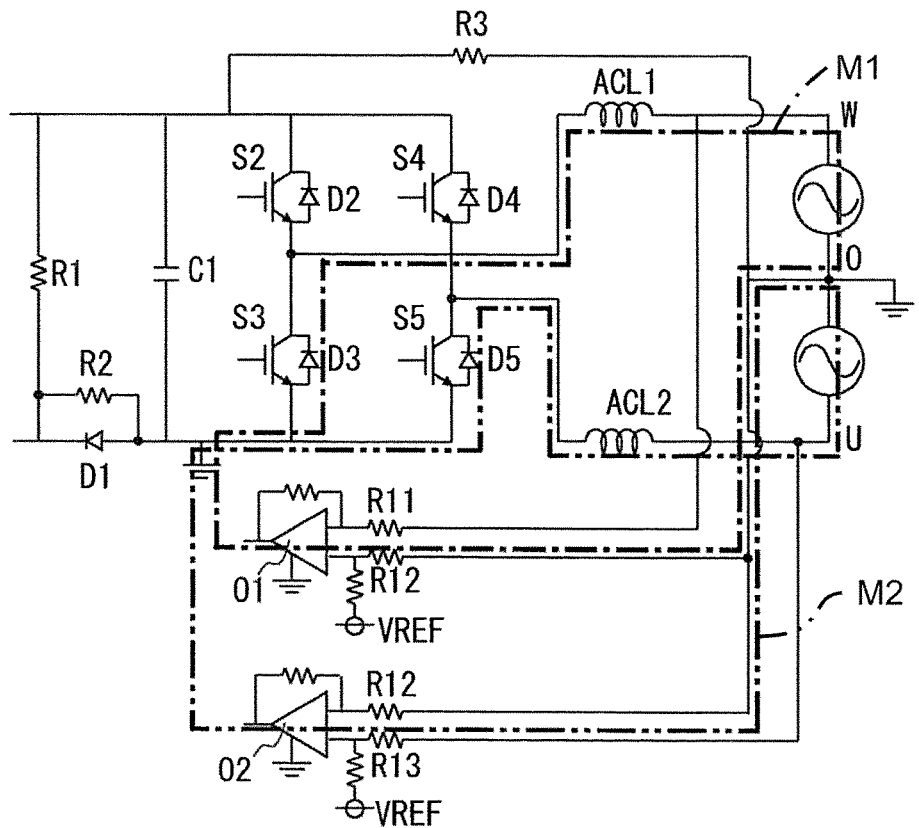
FIG. 25
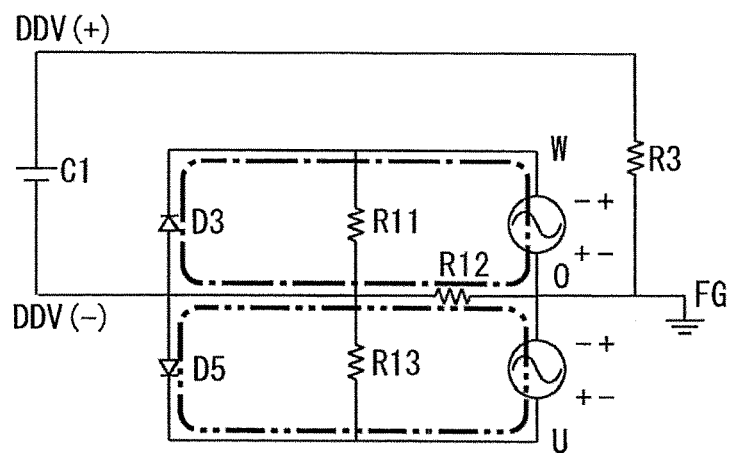
FIG. 26
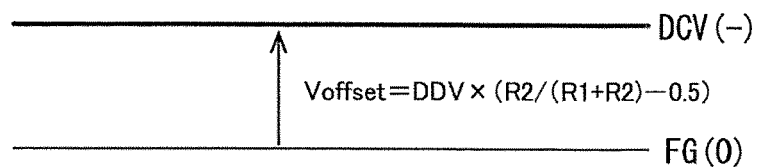

POWER SUPPLY SYSTEM, DC/DC
CONVERTER, AND POWER CONDITIONER
FOR SUPPRESSING PERFORMANCE
DEGRADATION IN SOLAR CELLS

CROSS-REFERENCE TO RELATED
APPLICATION

This application claims the priority benefit of Japanese Patent Application no. 2017-026424, filed on Feb. 15, 2017. The entirety of the above-mentioned patent application is hereby incorporated by reference herein and made a part of this specification.

BACKGROUND

Technical Field

The disclosure relates to a power supply system, a DC/DC converter, and a power conditioner.

Description of Related Art

In a solar power generation system that performs power generation using sunlight, a solar cell is connected to a commercial power system or a load device via a power conditioner including an inverter or the like, and power generated by the solar cell is supplied to the commercial power system or the load device.

In recent years, a voltage of a solar power generation system has increased, and transformerless types of inverters have increased for higher efficiency. Accordingly, a large potential difference may occur between a cell of a solar cell and a grounded frame. This is known to cause a leakage current and causes a potential induced degradation (PID) phenomenon when an external factor such as humidity or temperature (high temperature and high humidity) is applied.

FIG. 44 is a conceptual diagram illustrating an example of the PID phenomenon. FIG. 44 illustrates one solar cell string 10 in a solar cell array of a solar power generation system. In the solar cell string 10, a plurality of solar cell modules (solar cell panels) 1 are connected in series and are connected to a commercial power system via a power conditioner 30. That is, each solar cell module 1 of the solar cell string 10 receives sunlight during the daytime to generate power, and generates a potential difference between a positive input terminal 311 and a negative input terminal 312.

FIG. 45 is a diagram schematically illustrating a structure of the solar cell module 1. As illustrated in FIG. 45, the solar cell module 1 includes a frame 11, a back sheet 12, a cell 13, a glass 14, and a sealing material 15.

The cell 13 is an element having a semiconductor layer (power generation layer) that converts light energy into power using a photovoltaic effect. The glass 14 is provided on the light reception surface side of the cell 13, the back sheet 12 is provided on the non-light-reception surface side of the cell 13, and a space between the glass 14 and the back sheet 12, and the cell 13 is filled with the sealing material 15, such that the cell 13 is sealed. The frame 11 is used as a fixing member that is provided on an outer peripheral portion of the solar cell module 1 and fixed to a support or the like when the solar cell module 1 is installed. Further, the frame 11 is a conductive metal and is grounded.

As illustrated in FIG. 44, a ground potential of the cell 13 of each of the solar cell modules 1 connected in series is positive in the solar cell module 1 on the input terminal 311 side and is negative in the solar cell module 1 on the input terminal 312 side. When a potential difference with respect to a ground increases and a leakage current flows between the cell 13 of the solar cell module 1 and the frame 11 and between moisture 91 adhered to a glass surface and the cell 13 as indicated by dashed arrows in FIG. 45, sodium ions of the glass 14 or the like may migrate to the cell 13, which hinders movement of electrons in the cell 13 and causes performance degradation of the cell 13, that is, the PID phenomenon. For example, when the cell of the solar cell module 1 is a cell using a p-type semiconductor, performance degradation easily occurs when a negative ground potential is generated. Further, when the cell of the solar cell module 1 is a cell using an n-type semiconductor, the performance degradation easily occurs when a positive ground potential is generated.

Since the performance degradation due to the PID appears remarkably as the ground potential of the solar cell module 1 increases, a problem of the performance degradation due to the PID has also increased with the recent increase in voltage of solar cell systems.

However, even when the PID occurs and the performance of the solar cell module deteriorates, it is known that the degraded performance of each solar cell module gently recovers when the solar cell module stops generating power at night, and the ground potential decreases. However, since the recovery at nighttime is gentle and the performance is not sufficiently recovered, performance degradation progresses when the amount of recovery at nighttime is smaller than the amount of degradation during the daytime.

Therefore, a device that recovers degraded performance due to the PID by applying a predetermined voltage to a solar cell module at nighttime has been proposed. However, when the device that recovers degraded performance of a solar cell is separately attached, there is a problem in that an entire power supply device becomes larger and more complicated, which causes a problem of an increase in cost.

[Non-patent document 1] Mega Solar Business/trouble/, Nikkei BP, Inc. [Accessed on Sep. 13, 2016], Internet <http://techon.nikkeibp.co.jp/atcl/feature/15/302961/010500010/?ST=msb&P=1>.

SUMMARY

Accordingly, an object of the disclosure is to provide a technology for suppressing performance degradation due to PID.

According to the present invention, a power supply system including a solar cell; a non-isolated type DC/DC converter that boosts a DC voltage from the power supply input from an input end with a predetermined boosting ratio and outputs a DC voltage from an output end; and an inverter that converts a DC voltage output from the output end of the DC/DC converter into an AC voltage, the power supply system being connected to an external power system for system interconnection, wherein the power supply system includes a potential adjustment device for applying a voltage of an external power system to the solar cell via the inverter to set a ground potential of a negative electrode of the solar cell to positive when an output of the solar cell is smaller than a predetermined value.

Accordingly, through the operation of the potential adjustment device, the potential of the negative electrode of the solar cell can be maintained high when the output of the solar cell is smaller than the predetermined value at nighttime or the like (hereinafter also simply referred to as nighttime), and degraded performance due to potential induced degradation (PID) can be recovered.

Further, the disclosure may be a DC/DC converter used in the distributed power supply system described above. Further, the disclosure may be a power conditioner used in the distributed power supply system.

BRIEF DESCRIPTION OF THE DRAWINGS

FIG. 25 is a diagram illustrating an example of an inverter and an AC voltage measurement circuit in Modification Example 2-2.

FIG. 26 is a diagram illustrating an equivalent circuit of FIG. 25.

DESCRIPTION OF THE EMBODIMENTS

Figure 1:
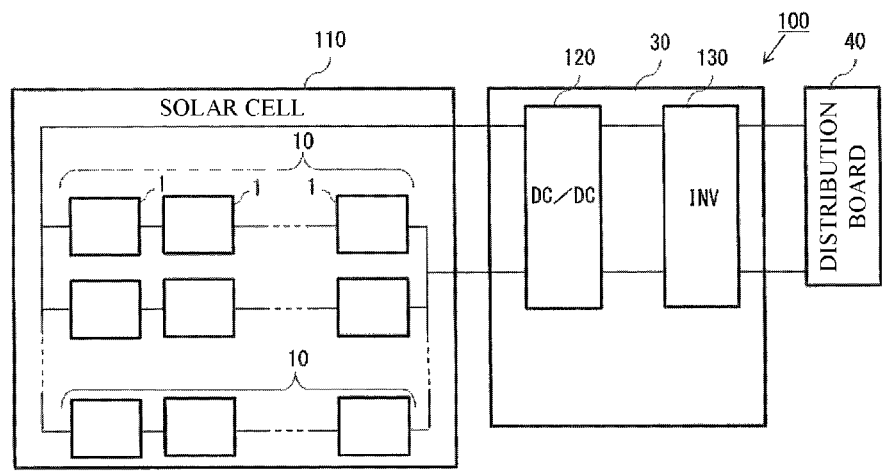
FIG. 1 is a diagram illustrating a configuration of a power supply system according to Embodiment 1.

In one or some of exemplary embodiments of the disclosure, the power supply system includes an AC voltage measurement circuit that measures an AC voltage at an output end of the inverter connected to the power system, wherein, when the output of the solar cell is smaller than the predetermined value, the voltage of the external power system is applied to the solar cell via the inverter and the AC voltage measurement circuit.

Accordingly, by using a circuit used for power conversion and voltage measurement as a circuit that applies a voltage to the solar cell at nighttime when the output of the solar cell is not smaller than the predetermined value (hereinafter also simply referred to as daytime), it is possible to recover degraded performance due to the PID through an operation of the potential adjustment device while suppressing an increase in the number of components.

In one or some of exemplary embodiments of the disclosure, the power supply system may include a circuit arrangement in which: the potential adjustment device includes a first resistor, a second resistor, and a diode, one end of the first resistor is connected to a positive electrode on the DC side of the inverter and the other end thereof is connected to a negative electrode of the inverter and the negative electrode of the solar cell, an anode of the diode is connected to the negative electrode of the inverter, a cathode thereof is connected to a negative electrode of the solar cell and one end on the negative electrode side of the first resistor, one end of the second resistor is connected to the negative electrode of the inverter, the other end thereof is connected to a negative electrode of the solar cell and one end on the negative electrode side of the first resistor, and the second resistor is connected in parallel to the diode. Accordingly, it is possible to more reliably enable the potential on the negative electrode side of the solar cell to be increased at nighttime.

In one or some of exemplary embodiments of the disclosure, the power supply system may include a DCV detection circuit that detects a DC voltage between both ends of the solar cell, the potential adjustment device may include a first resistor between a positive electrode and a negative electrode at an output end of the DC/DC converter, and a resistance value of the DCV detection circuit and a resistance value of the first resistor may be set at a predetermined ratio. Accordingly, it is possible to more reliably enable the potential on the negative electrode side of the solar cell to be increased at nighttime.

In one or some of exemplary embodiments of the disclosure, the potential adjustment device may include a switching device and a diode, one end of the switching device may be connected to the positive electrode at the output end of the DC/DC converter, the other end thereof may be connected to the negative electrode at the output end of the DC/DC converter, both of the ends may be switched between conduction and non-conduction, an anode of the diode may be connected to the negative electrode of the inverter, a cathode thereof may be connected to the negative electrode of the solar cell and one end on the negative electrode side of the switching device, the switching device may cause the positive and negative electrodes at the output end of the DC/DC converter to be conductive when the output of the solar cell is smaller than a predetermined value, and the switching device may cause the positive and negative electrodes at the output end of the DC/DC converter to be non-conductive when the output of the solar cell is not smaller than the predetermined value. Accordingly, it is possible to more reliably enable the potential on the negative electrode side of the solar cell to be increased at nighttime.

In one or some of exemplary embodiments of the disclosure, the power supply system may include a circuit arrangement in which: the potential adjustment device includes a first resistor, a second resistor, a third resistor, and a diode, one end of the first resistor is connected to the positive electrode on the DC side of the inverter, the other end thereof is connected to the negative electrode of the inverter and the negative electrode of the solar cell, an anode of the diode is connected to the negative electrode of the inverter, a cathode thereof is connected to the negative electrode of the solar cell and one end on the negative electrode side of the first resistor, one end of the second resistor is connected to the negative electrode of the inverter, the other end thereof is connected to the negative electrode of the solar cell and one end on the negative electrode side of the first resistor, the second resistor is connected in parallel to the diode, one end of the third resistor is connected to a zero phase of the inverter, and the other end thereof is connected to the positive electrode on the DC side of the inverter. Accordingly, it is possible to more reliably enable the potential on the negative electrode side of the solar cell to be increased at nighttime.

In one or some of exemplary embodiments of the disclosure, the power supply system may include a circuit arrangement in which: the potential adjustment device includes a first resistor, a second resistor, and a switching device, one end of the first resistor is connected to the positive electrode on the DC side of the inverter, the other end thereof is connected to the negative electrode of the inverter and the negative electrode of the solar cell, one end of the switching device is connected to the negative electrode of the inverter, the other end thereof is connected to the negative electrode of the solar cell and one end on the negative electrode side of the first resistor, one end of the second resistor is connected to the negative electrode of the inverter, the other end thereof is connected to the negative electrode of the solar cell and the end on the negative electrode side of the first resistor, and the second resistor is connected in parallel to the switching device. Accordingly, it is possible to more reliably enable the potential on the negative electrode side of the solar cell to be increased at nighttime. Further, the switching device may be a MOSFET or a relay.

In one or some of exemplary embodiments of the disclosure, the potential adjustment device may include a first resistor, a second resistor, and a three-terminal relay, one end of the first resistor may be connected to the positive electrode on the DC side of the inverter, the other end thereof may be connected to a first terminal of a three-terminal relay, one end of the second resistor may be connected to the negative electrode of the inverter and a second terminal of the three-terminal relay, the other end thereof may be connected to the first terminal of the three-terminal relay, a common terminal of the three-terminal relay may be connected to the negative electrode of the solar cell, the negative electrode of the solar cell and the negative electrode at the output end of the DC/DC converter may be connected during the daytime in the three-terminal relay, the three-terminal relay may cause the negative electrode of the solar cell and the first terminal to be conductive when the output of the solar cell is not smaller than the predetermined value, and the three-terminal relay may cause the negative electrode of the solar cell and the second terminal to be conductive when the output of the solar cell is smaller than the predetermined value. Accordingly, it is possible to more reliably enable the potential on the negative electrode side of the solar cell to be increased at nighttime.

In one or some of exemplary embodiments of the disclosure, the potential adjustment device may include a first resistor, a second resistor, and a disconnection device, the first resistor and the second resistor may be connected in series between the positive electrode and the negative electrode on the DC side of the inverter, the disconnection device for electrically disconnecting the solar cell from the input end of the DC/DC converter may be included between the positive electrode of the solar cell and the positive electrode at the input end of the DC/DC converter and between the negative electrode of the solar cell and the negative electrode at the input end of the DC/DC converter, and a portion between the first resistor and the second resistor and a portion of the negative electrode of the solar cell separated by the disconnection device may be connected to a solar cell side. Accordingly, it is possible to more reliably enable the potential on the negative electrode side of the solar cell to be increased at nighttime.

In one or some of exemplary embodiments of the disclosure, the power supply system may include a circuit arrange in which: the potential adjustment device may include a first switching device and a second switching device, one end of the first switching device may be connected to the positive electrode on the DC side of the inverter, the other end thereof may be connected to the negative electrode of the inverter and the negative electrode of the solar cell, one end of the second switching device may be connected to the negative electrode of the inverter, and the other end thereof may be connected to the negative electrode of the solar cell and one end on the negative electrode side of the first switching device. Accordingly, it is possible to more reliably enable the potential on the negative electrode side of the solar cell to be increased at nighttime.

In one or some of exemplary embodiments of the disclosure, the solar cell may include a plurality of solar cell strings in which a plurality of solar cell panels are connected in series or in parallel, a plurality of DC/DC converters respectively connected to the plurality of solar cell strings may be included, and a potential adjustment device may be included between an output end of the plurality of DC/DC converters and the inverter. Accordingly, it is possible to more reliably enable the potential on the negative electrode side of the solar cell to be increased at nighttime. Further, the plurality of DC/DC converters may be connected in series.

In one or some of exemplary embodiments of the disclosure, the solar cell may include a plurality of solar cell strings in which a plurality of solar cell panels are connected in series or in parallel, a plurality of DC/DC converters respectively connected to the plurality of solar cell strings may be included, and the potential adjustment device may be included in each of the plurality of DC/DC converters. Accordingly, it is possible to enable the potential on the negative electrode side of the solar cell to be increased at nighttime even in a configuration in which the DC/DC converter is included in each of the plurality of solar cell strings.

According to the disclosure, performance degradation of the solar cell due to PID can be suppressed.

Hereinafter, specific embodiments to which the present technology has been applied will be described with reference to the drawings.

Embodiment 1

FIG. 1 is a diagram illustrating a configuration of a power supply system according to Embodiment 1. In FIG. 1, a power supply system 100 includes a solar cell 110 and a power conditioner (also referred to as a power conditioning system (PCS)) 30, and is connected to a commercial power system or a load device via a distribution board 40.

Figure 45:
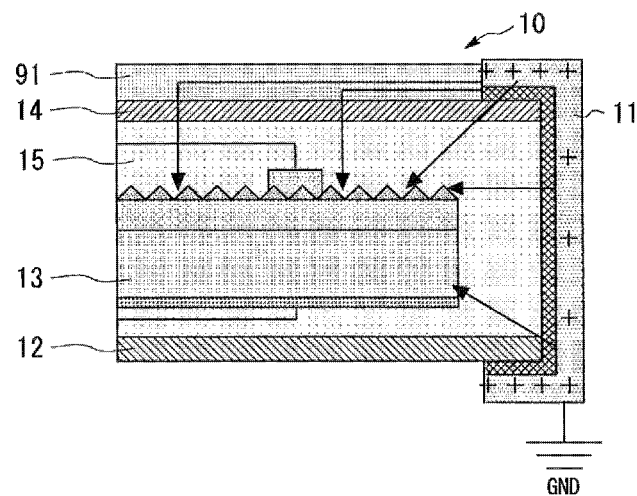
FIG. 45 is a diagram schematically illustrating the structure of a solar cell module.

The solar cell 110 is configured by connecting, in parallel, a plurality of solar cell strings 10 each including a plurality of solar cell modules 1 connected in series. Each solar cell module 1 is a module that converts solar energy into electric energy using a photovoltaic effect and outputs the electric energy as direct current power. For example, the solar cell module 1 has a known configuration illustrated in FIG. 45, in which a panel in which a cell 13 is sealed between the glass 14 and the back sheet 12 is held by the frame 11. One cell 13 is schematically illustrated in FIG. 45, but a plurality of cells 13 are provided in the solar cell module 1 and are connected in series by an electrode pattern 16, and a plurality of cells 13 connected in series are connected in parallel. The cells 13 are connected to an output terminal (not illustrated) of the solar cell module 1, and power generated by each cell 13 is output from the output terminal. Separately from internal circuits such as the cells 13, the frame 11 is grounded and the cell 13 has a potential difference (ground potential) between the cell 13 and the frame 11, such that the occurrence of PID due to this ground potential is suppressed as will be described below.

The power conditioner 30 includes a DC/DC converter 120 that converts (boosts in this example) an output from the solar cell 110 to a predetermined DC voltage, and an inverter 31 that converts DC power output from the DC/DC converter 120 into AC power, and supplies the AC power output from the inverter 31 to the commercial power system or the load device. Further, the power conditioner 30 includes a system interconnection relay or the like, and controls connection (system interconnection) to or disconnection from the commercial power system.

Figure 2:
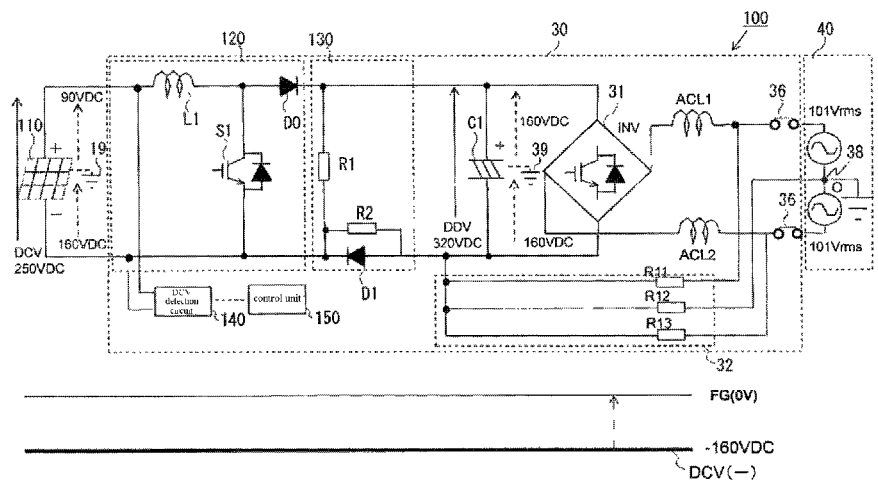
FIG. 2 is a diagram illustrating a circuit configuration of a power supply system according to Embodiment 1 (daytime).
Figure 3:
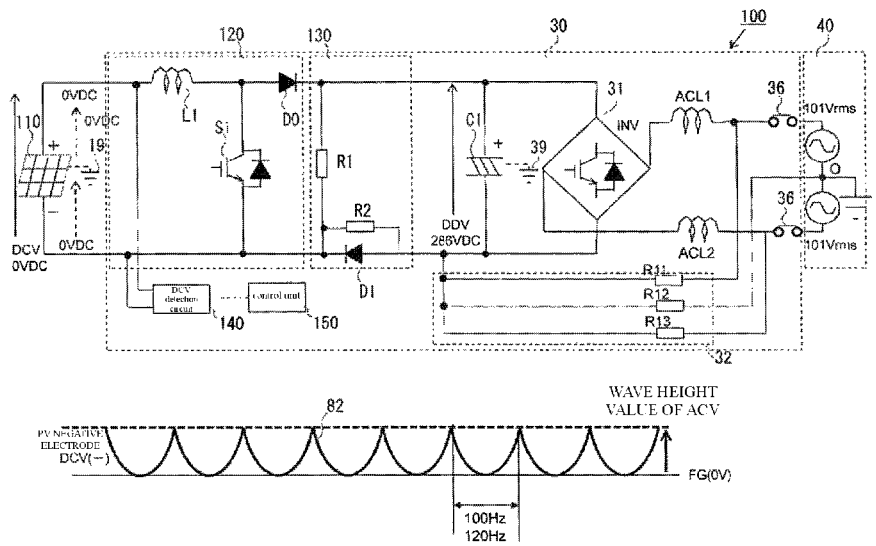
FIG. 3 is a diagram illustrating the circuit configuration of the power supply system according to Embodiment 1 (nighttime).

FIGS. 2 and 3 are diagrams illustrating a circuit configuration of the power supply system 100 according to Embodiment 1. FIG. 2 illustrates a power state during the daytime, and FIG. 3 illustrates a power state at nighttime.

The DC/DC converter 120 connected to the solar cell 110 is a non-insulated boosting circuit including a reactor L1, a boosting switching element S1, and a diode D0.

The reactor L1 has one end connected to the positive electrode of the solar cell 110 and the other end connected to an anode of the diode D0 and one end on the high potential side of the switching element S1.

The diode D0 has the anode connected to the reactor L1 and the end on the high potential side of the switching element S1, and a cathode connected to a positive electrode of an output end of the DC/DC converter 120. That is, the reactor L1 and the diode D0 are connected in series in a positive electrode side line of the DC/DC converter 120.

The switching element S1 is connected in parallel to the solar cell 110. One end on the high potential side of the switching element S1 is connected to the positive electrode of the solar cell 110 and the positive electrode at the output end of the DC/DC converter 120. One end on the low potential side of the switching element S1 is connected to the negative electrode of the solar cell 110 and the negative electrode at the output end of the DC/DC converter 120. The switching element S1 is driven by a driving circuit (not illustrated) to perform switching, intermittently charge/discharge the reactor L1, and thereby perform boosting.

The switching element S1 may be a device that performs switching, such as a metal oxide semiconductor (MOS) field effect transistor, an insulated gate bipolar transistor (IGBT), a bipolar transistor, a thyristor, or the like. In this example, the IGBT is used.

The DC/DC converter 120 boosts the DC voltage (for example, 250 V) input from the solar cell 110 to a predetermined voltage (for example, 320 V) using the switching operation of the switching element S1.

When the output of the solar cell 110 is smaller than the predetermined value, for example, at nighttime, a potential adjustment device 130 applies a voltage of an external power system to the solar cell via the inverter 31 to set the ground potential of the negative electrode of the solar cell to positive. The potential adjustment device 130 of this embodiment includes resistors R1 and R2 and a diode D1. The diode D1 has a cathode connected to the negative electrode of the solar cell 110, and an anode connected to the negative electrode of the inverter 31. The resistor R1 is connected between the positive electrode and the negative electrode of the solar cell 110, and the resistor R2 is connected to a negative electrode side line in parallel to the diode D1.

A capacitor C1 is a filter circuit that is connected between positive and negative electrodes on the DC side of the inverter 31 and smoothes a noise component of the DC voltage from the solar cell 110 that is input via the DC/DC converter 120.

The inverter 31 converts the DC power from the solar cell 110 into AC power and outputs the AC power via the reactors ACL1 and ACL2.

A DCV detection circuit 140 is connected between the positive electrode and the negative electrode of the solar cell 110 and detects the output voltage of the solar cell 110. On the basis of a detection result of the DCV detection circuit 140, the control unit 150 determines that it is nighttime when the output voltage of the solar cell 110 is smaller than a threshold value. Further, when the output voltage of the solar cell 110 is not smaller than the threshold value, the control unit 150 determines that it is daytime. The determination as to whether it is nighttime or daytime is not limited to measuring the output voltage of the solar cell 110. For example, the determination may be made based on whether or not it is time at which the output voltage of the solar cell 110 becomes smaller than the threshold value with reference to a timer. Further, the control unit 150 gate-blocks the inverter 31 or the DC/DC converter 120 when it is determined to be nighttime, and operates the inverter 31 or the DC/DC converter 120 when it is determined to be daytime. Control of whether the inverter 31 or the DC/DC converter 120 is to be operated or gate-blocked may be performed by each drive circuit (not illustrated).

The AC voltage measurement circuit 32 measures the AC voltage at the output end of the power conditioner 30. The AC voltage measured by the AC voltage measurement circuit 32 is used for a determination of the disconnection from the power system, for example.

In the power supply system 100 of this embodiment, a rated output of the solar cell 110 is 250 VDC, the DC/DC converter 120 boosts the output of the solar cell 110 to a predetermined voltage DDV (320 VDC in this example), and the inverter 31 converts the output of the DC/DC converter 120 to AC. The power supply system 100 of this embodiment is connected to a single-phase three-wire commercial power system, and power (for example, 101 Vrms) between the output end and a frame ground (FG) 38 that is output from the inverter 31 via the reactor ACL1 and between the output end and the frame ground 38 that is output via the reactor ACL2 is output to the commercial power system.

In the power supply system 100, the voltage DDV between the positive and negative electrodes on the input side of the inverter 31 is, for example, 320 VDC as illustrated in FIG. 2 in a daytime state in which the solar cell 110 generates power, and therefore the voltage of the positive electrode with respect to the ground 39 is +160 VDC, and the voltage of the negative electrode with respect to the ground 39 is −160 VDC. In the configuration of FIG. 2, since the ground potential of the solar cell 110 becomes equal to the ground potential of the negative electrode of the inverter 31, the ground voltage of the negative electrode in the solar cell 110 also becomes −160 VDC, and when the output of the solar cell 110 is 250 VDC, the voltage of the positive electrode of the solar cell 110 with respect to the ground 19 is +90 VDC. Thus, in the solar cell 110, since the ground potential of the negative electrode is negative during power generation, PID is likely to progress.

Therefore, at nighttime when the solar cell 110 does not generate power, the power supply system 100 of this embodiment gate-blocks the switching element S1 and the inverter 31 and turns on the system interconnection relay 36 to supply the power on the commercial power system side to the solar cell via the inverter 31 and apply the voltage DDV between the positive and negative electrodes, as illustrated in FIG. 3, reversely to the daytime. By dividing this voltage DDV using the resistors R1 and R2 of the potential adjustment device 130, a positive voltage is applied to the negative electrode of the solar cell 110.

As described above, in the power supply system 100 of this embodiment, degraded performance due to PID progressing during power generation can be recovered by setting the ground potential of the negative electrode of the solar cell 110 to positive at nighttime or the like when the solar cell 110 does not generate power.

Figure 4:
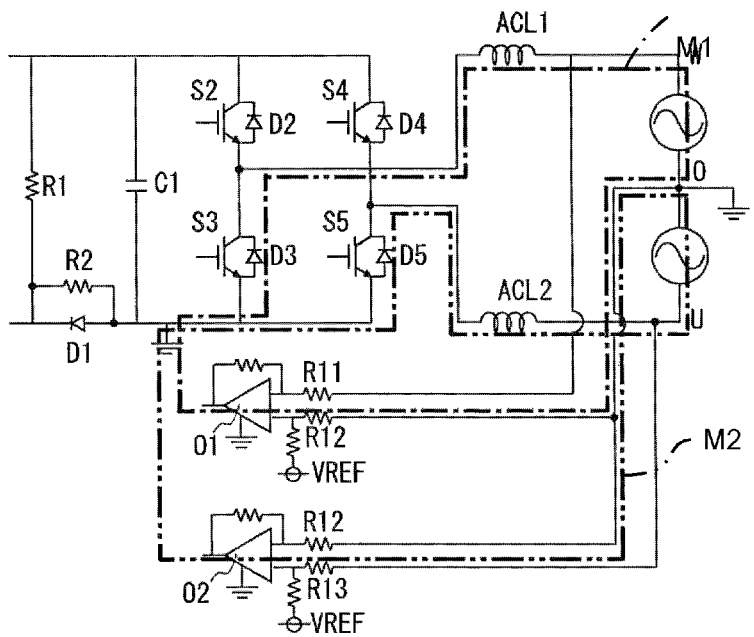
FIG. 4 is a diagram illustrating an example of an inverter and an AC voltage measurement circuit.

FIG. 4 is a diagram illustrating an example of the inverter 31 and the AC voltage measurement circuit 32. As illustrated in FIG. 4, a bridge is configured in the inverter 31, for example, by switching elements S2 to S5 and freewheeling diodes D2 to D5. Further, the AC voltage measurement circuit 32 includes, for example, operational amplifiers O1 and O2, compares a voltage between the output end 34 and the frame ground 38 and a voltage between an output end 35 and the frame ground 38 with a reference voltage Vref, and outputs a difference therebetween as a measurement result.

When the switching elements S2 to S5 are gate-blocked at nighttime, the inverter 31 functions as a diode bridge, and a circuit M1 indicated by a dash-dotted line passing through the operational amplifier O1, the diode D4, the reactor ACL1, and the resistor R12 is configured, and the power of the commercial power system is supplied from the output end 34 and the frame ground 38 to the circuit M1. Further, a circuit M2 indicated by a two-dot chain line passing through the operational amplifier O2, the diode D5, the reactor ACL2, and the resistor R12 is configured, and the power of the commercial power system is supplied from the output end 35 and the frame ground 38 to the circuit M2.

As illustrated in FIG. 4, the power supplied to the circuits M1 and M2 is rectified by the diodes D4 and D5, and the voltage DDV is applied between the positive and negative electrodes of the inverter 31. By dividing this voltage DDV using the resistors R1 and R2 of the potential adjustment device 130, a positive voltage 82 is applied to the negative electrode of the solar cell 110 as illustrated in FIG. 3. In the example of FIG. 3, the voltage DDV is $\sqrt{2} \times 202$ VAC=286 VDC, and the maximum value Voffset of the voltage DCV (−) applied to the negative electrode of the solar cell 110 is $\sqrt{2} \times 202$ VAC×R2/(R1+R2)=143 VDC. The voltage DCV(−) applied to the negative electrode of the solar cell 110 is determined by a ratio of the resistor R1 and the resistor R2, and in this example R:R2=1:1.

Comparison with Other Configuration Examples

Next, a PID suppression effect of the power supply system 100 according to Embodiment 1 will be described in comparison with other configuration examples.

Figure 5:
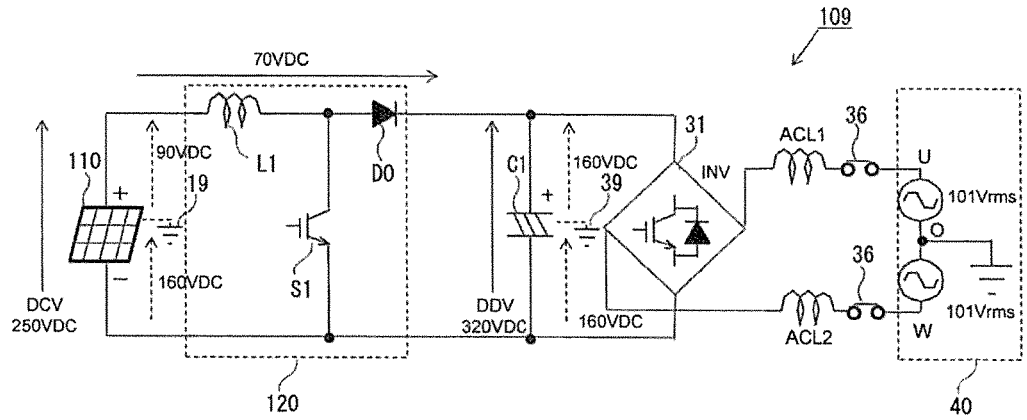
FIG. 5 is a diagram illustrating a circuit configuration of a power supply system according to Comparative Example 1 (daytime).
Figure 6:
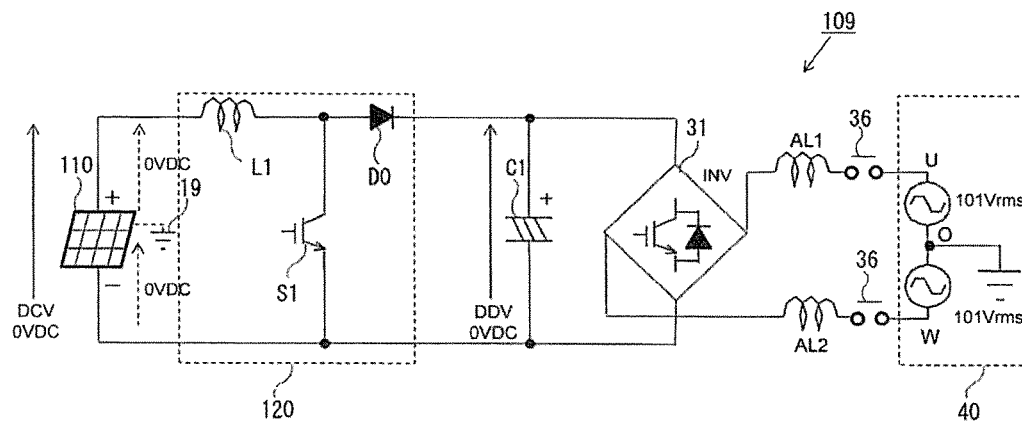
FIG. 6 is a diagram illustrating the circuit configuration of the power supply system according to Comparative Example 1 (nighttime).
Figure 7:
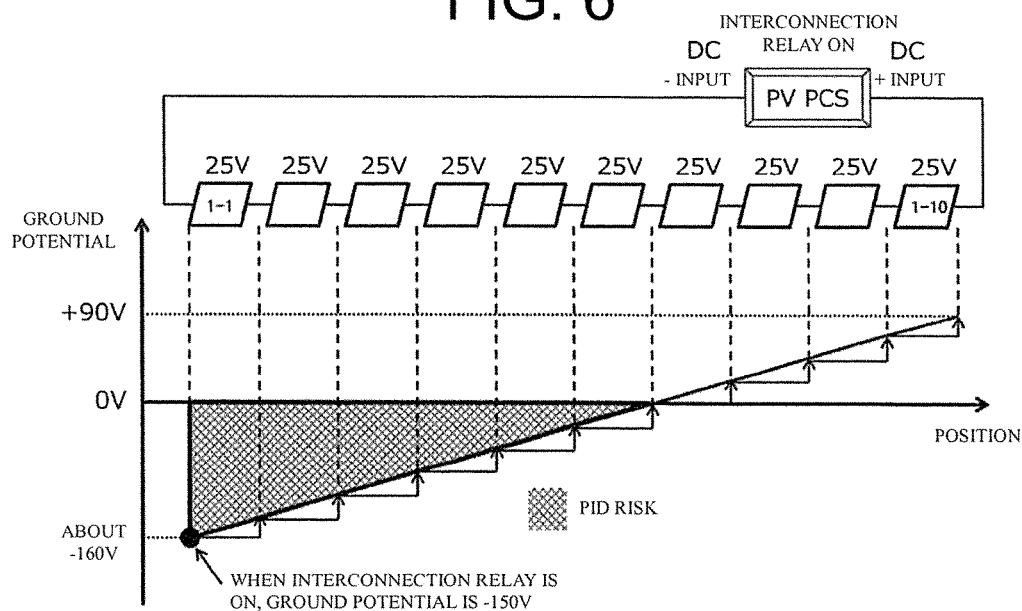
FIG. 7 is a diagram illustrating a ground potential during the daytime in Comparative Example 1.
Figure 8:
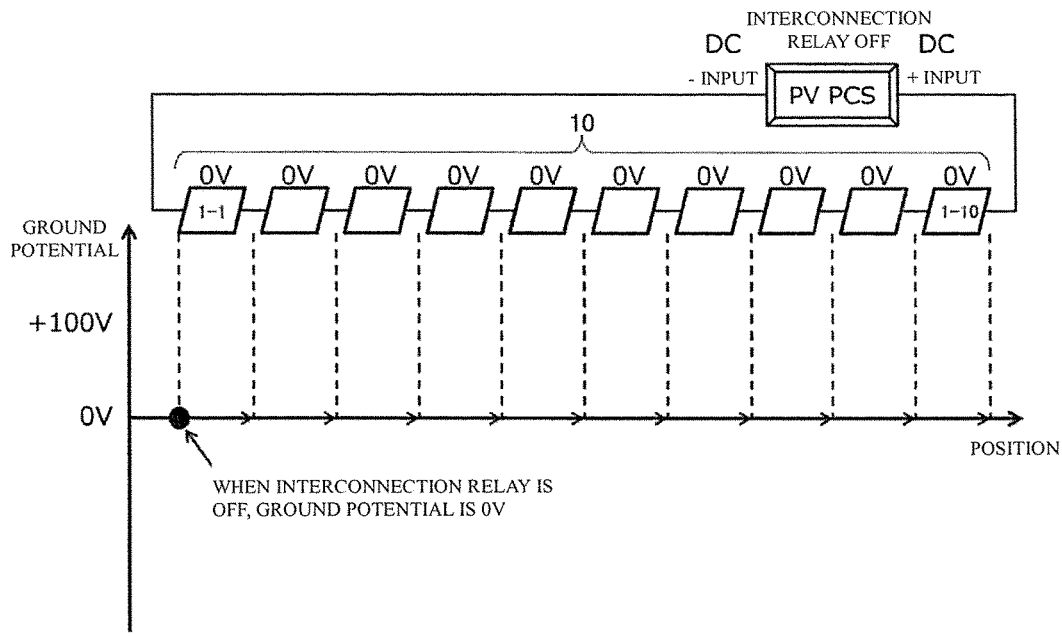
FIG. 8 is a diagram illustrating a ground potential at nighttime in Comparative Example 1.

FIGS. 5 and 6 are diagrams illustrating a circuit configuration of the power supply system 109 according to Comparative Example 1, FIG. 5 illustrates a state during the daytime, and FIG. 6 illustrates a state at nighttime. Further, FIG. 7 is a diagram illustrating the ground potential during the daytime in Comparative Example 1, and FIG. 8 is a diagram illustrating the ground potential at nighttime in Comparative Example 1.

The power supply system 109 of Comparative Example 1 is different from the power supply system 100 of Embodiment 1 in a configuration in which the potential adjustment device 130 is not included. The same elements as those of the power supply system 100 described above are denoted with the same reference numerals, and repeated description will be omitted.

In the power supply system 109 of Comparative Example 1, the ground potential of the solar cell 110 that is generating the power is the same as the ground potential on the negative electrode side of the inverter 31 as in this embodiment of FIG. 2. Accordingly, for example, as illustrated in FIG. 5, when a potential difference between the positive and negative electrodes on the DC side of the inverter 31 is 320 V and the potential of the negative electrode with respect to the ground 39 is −160 V, the potential of the negative electrode of the solar cell 110 becomes −160 V with respect to the ground 19. When the solar cell 110 generates power during the daytime and the potential difference between the positive electrode and the negative electrode becomes 250 V, the potential (ground potential) of the positive electrode with respect to the ground 19 becomes +90 V. Therefore, as illustrated in FIG. 7, the solar cell module 1 on the negative electrode side has a negative ground potential, and when a p-type semiconductor is used for the cell 13, a risk of performance degradation due to PID occurs as indicated by shading in FIG. 7. Since this risk of performance degradation increases as the ground potential decreases, the performance degradation progresses in the solar cell module on the negative side.

Further, when the solar cell 110 does not generate power at nighttime, the power conditioner 30 turns off the system interconnection relay 36 and is disconnected from the commercial power system. Therefore, ground potentials of the power conditioner 30 and the solar cell 110 are 0 V.

Therefore, the ground potential of each solar cell module 1 becomes 0 V as illustrated in FIG. 8. Therefore, there is no risk of PID at nighttime, and when performance degradation due to the PID has occurred during the daytime, the performance is likely to be recovered gently at nighttime. However, since the recovery when the ground potential of the solar cell module 1 is 0 V is gentle, the performance degradation due to PID progresses when the amount of performance degradation during the daytime exceeds the amount of recovery at nighttime.

Figure 9:
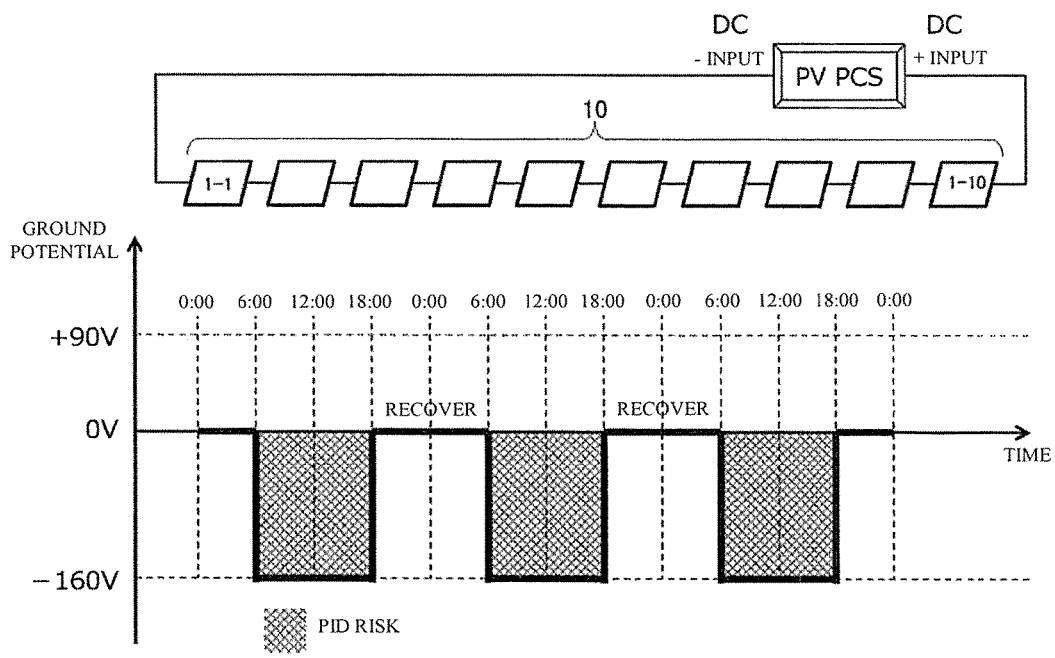
FIG. 9 is a diagram schematically illustrating a change in a ground potential over time in a solar cell module on the most negative side in a solar cell string.
Figure 10:
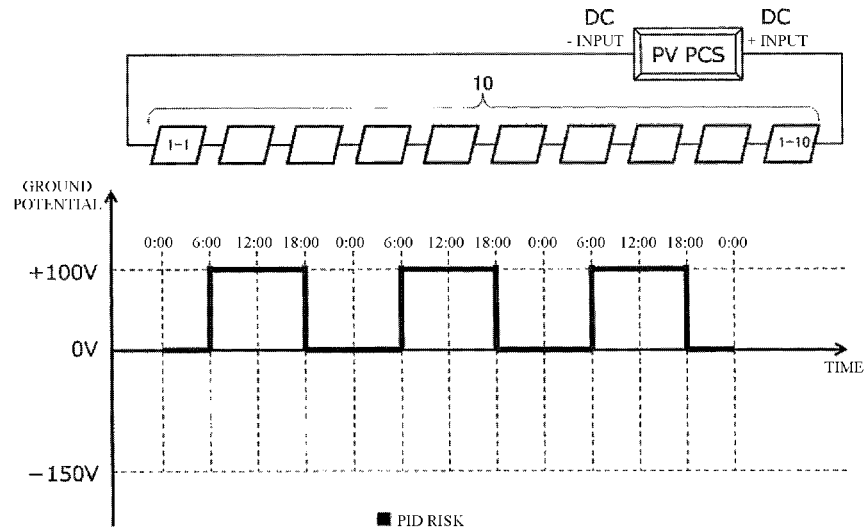
FIG. 10 is a diagram schematically illustrating a change in a ground potential over time in a solar cell module on the most positive side in a solar cell string.

FIG. 9 is a diagram schematically illustrating a change in the ground potential over time in the solar cell module 1-1 on the most negative side in the solar cell string 10, and FIG. 10 is a diagram schematically illustrating a change in the ground potential over time in the solar cell module 1-10 on the most positive side in the solar cell string 10.

As illustrated in FIG. 9, in the power supply system 109 of Comparative Example 1, since the solar cell module 1-1 on the most negative electrode side has a negative ground potential (for example, −160 V) during a time zone in which the solar cell 110 generates power, PID is promoted. On the other hand, since the ground potential of the solar cell module 1-1 in the time zone in which the solar cell 110 does not generate power is 0 V, the degraded performance due to PID is gently recovered. In this case, since the recovery at nighttime is small and the performance degradation during the daytime is large, the performance degradation of the solar cell module 1-1 progresses.

As illustrated in FIG. 10, in the power supply system 109 of Comparative Example 1, since the solar cell module 1-10 on the most positive side has a positive ground potential (for example, +90 V) in a time zone in which the solar cell 110 generates power, there is no risk of performance degradation due to PID. Further, even in the time zone in which the solar cell 110 does not generate power, the ground potential of the solar cell module 1-10 is 0 V, and therefore, there is no risk of performance degradation due to PID.

As described above, in Comparative Example 1, since the recovery at nighttime is small, the performance degradation of the solar cell module on the negative electrode side of the solar cell 110 progresses.

On the other hand, in Embodiment 1, since the ground potential of the negative electrode of the solar cell 110 in the solar cell 110 is set to positive using the power of the commercial power system at nighttime, necessary recovery can be performed, and the performance degradation due to PID can be prevented from progressing.

Modification Example 1-1

Figure 11:
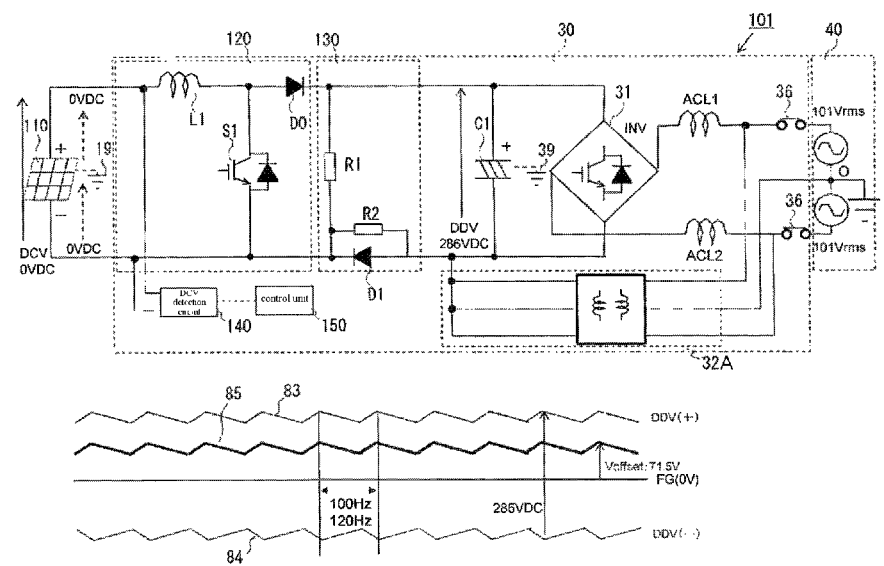
FIG. 11 is a diagram illustrating a circuit configuration of a power supply system according to Modification Example 1-1.

FIG. 11 is a diagram illustrating a circuit configuration of a power supply system 101 according to Modification Example 1-1. Modification Example 1-1 is different from Embodiment 1 described above in that the AC voltage measurement circuit is of an insulating type, and is the same as Embodiment 1 in the other configurations. Therefore, the same elements as those of Embodiment 1 are denoted with the same reference numerals, and repeated description will be omitted.

An AC voltage measurement circuit 32A of this example includes a transformer or an isolation amplifier and insulates a DC circuit side from a power system side. In the power supply system 101 of this example, when power of the commercial power system is supplied via the inverter 31 in a state in which the inverter 31 is gate-blocked, a potential 83 of the positive electrode and a potential 84 of the negative electrode in the inverter 31 have ripples derived from AC power on the commercial power system side, and a voltage DDV between the potentials is 286 VDC, as illustrated in FIG. 11.

This voltage DDV is divided by the resistors R1 and R2 of the potential adjustment device 130 and the maximum value Voffset of the voltage DCV(−) applied to the negative electrode of the solar cell 110 is $\sqrt{2} \times 202$ VAC×(R2/(R1+R2)−0.5)=71.5 VDC. In this example, R1=⅓×R2. In this case, the voltage DCV(−) has a ripple derived from AC power on the commercial power system side as indicated by reference numeral 85 in FIG. 11.

Thus, in this power supply system 101 of Modification Example 1-1, by setting the ground potential of the negative electrode of the solar cell 110 in the solar cell 110 to positive (for example, 71.5 VDC) using the power of the commercial power system at nighttime, necessary recovery can be performed, and the performance degradation due to PID can be prevented from progressing.

Modification Example 1-2

Figure 12:
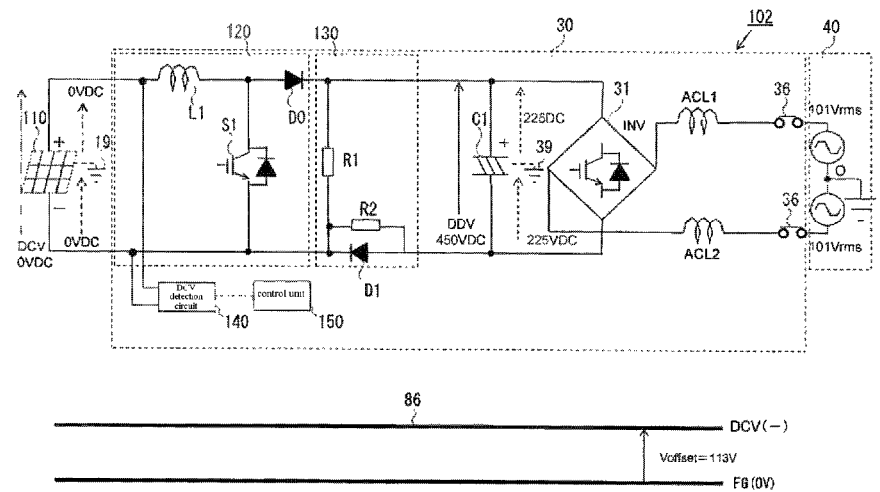
FIG. 12 is a diagram illustrating a circuit configuration of a power supply system according to Modification Example 1-2.

FIG. 12 is a diagram illustrating a circuit configuration of a power supply system 102 according to Modification Example 1-2. Modification Example 1-2 is different from Embodiment 1 described above in a configuration in which the inverter 31 converts the AC power of the commercial power system into DC power and supplies the DC power to the solar cell 110 when the output of the solar cell is smaller than a predetermined value at nighttime or the like, and is the same as Embodiment 1 in other configurations. Therefore, the same elements as those of Embodiment 1 are denoted with the same reference numerals, and repeated description will be omitted.

In the power supply system 102 of this example, when the control unit 150 determines that it is nighttime, the switching element S1 is stopped, and the AC power of the commercial power system is converted into DC power by the inverter 31 such that the voltage DDV between the positive and negative electrodes of the inverter 31 is, for example, 450 VDC.

This voltage DDV is divided by the resistors R1 and R2 of the potential adjustment device 130 and the maximum value Voffset of the voltage DCV(−) applied to the negative electrode of the solar cell 110 is 450 VAC×(R2/(R1+R2)−0.5)=113 VDC. In this example, R1=⅓×R2. In the power supply system 102 of this example, since the inverter 31 is operated to convert the AC power into DC power, a voltage 86 that does not substantially fluctuate can be obtained as illustrated in FIG. 12.

Thus, the power supply system 102 of this modification example 1-2 can prevent the progression of performance degradation due to PID by setting the ground potential of the negative electrode in the solar cell 110 to positive (for example, 113 VDC) at nighttime.

Modification Example 1-3

Figure 13:
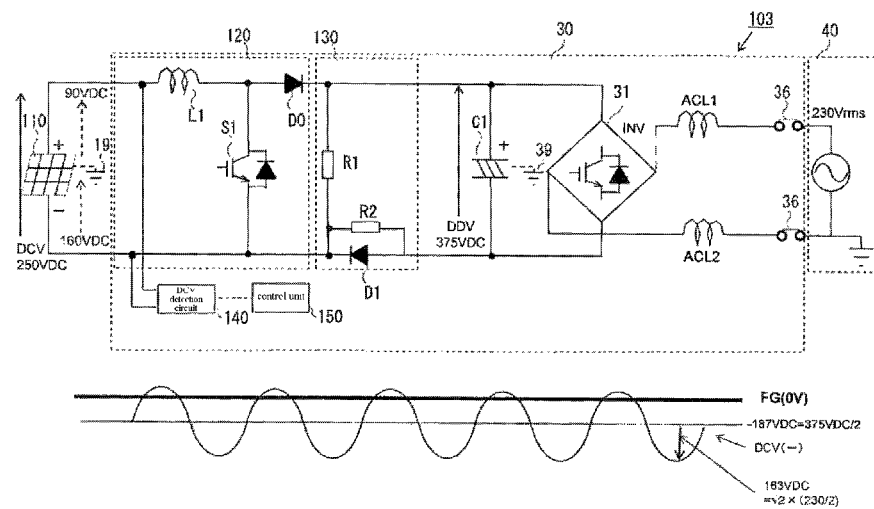
FIG. 13 is a diagram illustrating a circuit configuration of a power supply system according to Modification Example 1-3 (daytime).
Figure 14:
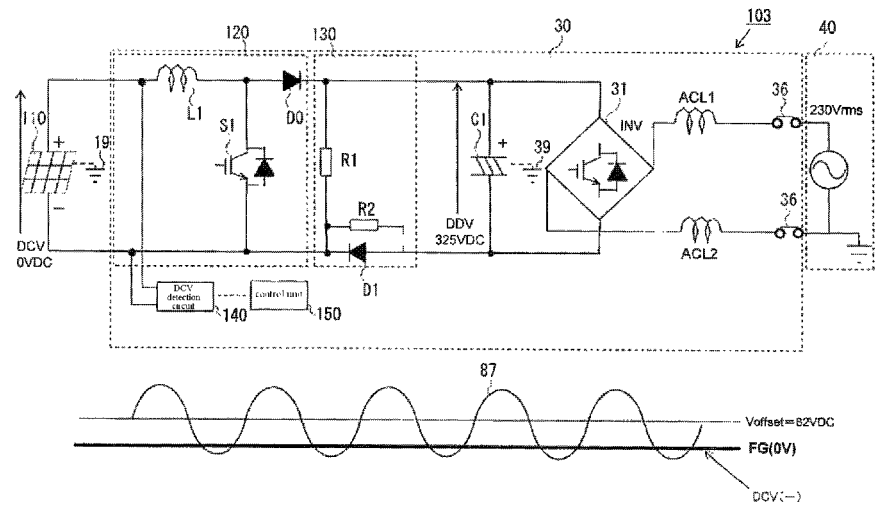
FIG. 14 is a diagram illustrating the circuit configuration of the power supply system according to Modification Example 1-3 (nighttime).

FIG. 13 is a diagram illustrating a state of the power supply system 103 according to Modification Example 1-3 during the daytime, and FIG. 14 is a diagram illustrating a state of the power supply system 103 according to Modification Example 1-3 at nighttime. The power supply system 103 of Modification Example 1-3 is different from that of Modification Example 1-1 described above in a configuration connected to a single-phase two-wire commercial power system, and is the same as Modification Example 1-1 in other configurations. Therefore, the same elements as those of the Modification Example 1-1 described above are denoted with the same reference numerals and repeated description will be omitted. Further, in this example, the same elements as those in FIG. 2 and FIG. 3, such as the AC voltage measurement circuit 32, the DCV detection circuit 140, and the control unit 150, are omitted.

In the power supply system 103 of this example, the voltage DDV between the positive and negative electrodes of the inverter 31 is set to 375 VDC during the daytime, and the ground voltage of the negative electrode in the solar cell 110 is −187 VDC.

When the inverter 31 is gate-blocked at nighttime, the power supply system 103 of this example supplies the power of the commercial power system to a DC circuit via the inverter 31 in a state in which the inverter 31 is gate-blocked, and the voltage DDV between the positive and negative electrodes in the inverter 31 is set to 325 VDC.

This voltage DDV is divided by the resistors R1 and R2 of the potential adjustment device 130 and the voltage DCV(−) that is applied to the negative electrode of the solar cell 110 is $\sqrt{2}$×230 VAC×(R2/(R1+R2)−0.5)=82 VDC. In this example, R1=⅓×R2. The voltage DCV(−) applied to the negative electrode of the solar cell 110 has a sinusoidal fluctuation that is derived from the AC power on the commercial power system side as indicated by reference numeral 87 in FIG. 14.

Thus, the power supply system 103 of this modification example 1-3 can prevent the progression of performance degradation due to PID by setting the ground potential of the negative electrode in the solar cell 110 to positive at nighttime, as in Modification Example 1-1 described above.

Modification Example 1-4

Figure 15:
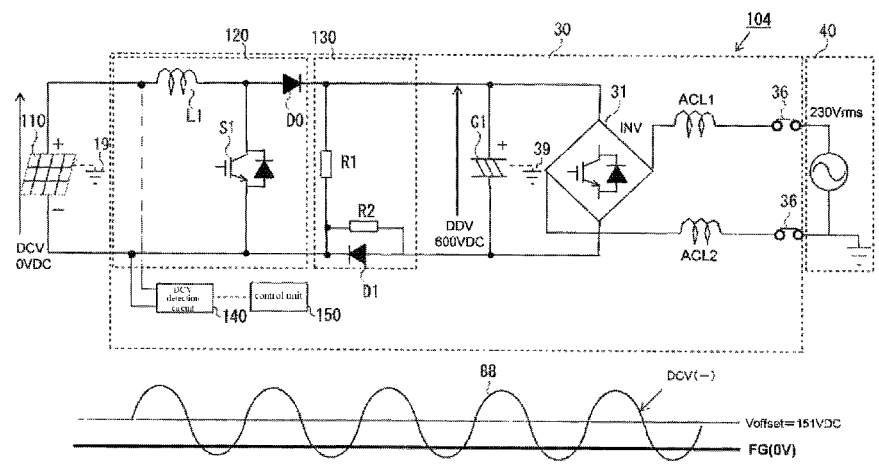
FIG. 15 is a diagram illustrating a circuit configuration of a power supply system according to Modification Example 1-4.

FIG. 15 is a diagram illustrating a circuit configuration of a power supply system 104 according to Modification Example 1-4. Modification Example 1-4 is different from Modification Example 1-2 described above in a configuration connected to a single-phase two-wire commercial power system, and is the same as Modification Example 1-2 in other configurations. Therefore, the same elements as those of Modification Example 1-2 described above are denoted with the same reference numerals and repeated description will be omitted. Further, in this example, the same elements as those in FIG. 12, such as the AC voltage measurement circuit 32, the DCV detection circuit 140, and the control unit 150, are omitted.

In the power supply system 104 of this example, when the control unit 150 determines that it is nighttime, the switching element S1 is stopped, and the AC power of the commercial power system is converted into DC power by the inverter 31 such that the voltage DDV between the positive and negative electrodes of the inverter 31A is, for example, 600 VDC.

This voltage DDV is divided by the resistors R1 and R2 of the potential adjustment device 130 and the voltage DCV(−) that is applied to the negative electrode of the solar cell 110 is 600 VAC×(R2/(R1+R2)−0.5)=151 VDC. In this example, R1=⅓×R2. The voltage DCV(−) applied to the negative electrode of the solar cell 110 has a sinusoidal fluctuation that is derived from the AC power on the commercial power system side as indicated by reference numeral 88 in FIG. 15.

Thus, this power supply system 104 of Modification Example 1-4 can prevent the progression of performance degradation due to the PID by setting the ground potential of the negative electrode in the solar cell 110 to positive at nighttime, as in Modification Example 1-2 described above.

Modification Example 1-5

Figure 16:
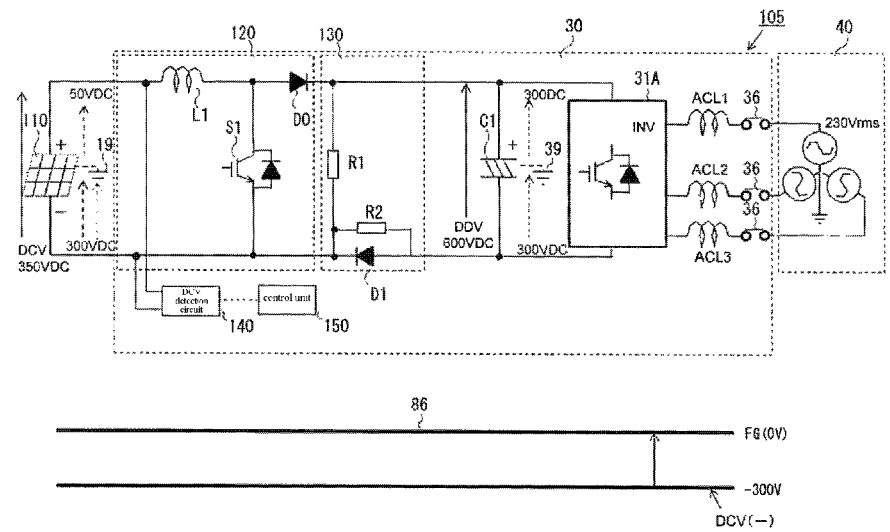
FIG. 16 is a diagram illustrating a state of a power supply system according to Modification Example 1-5 during the daytime.
Figure 17:
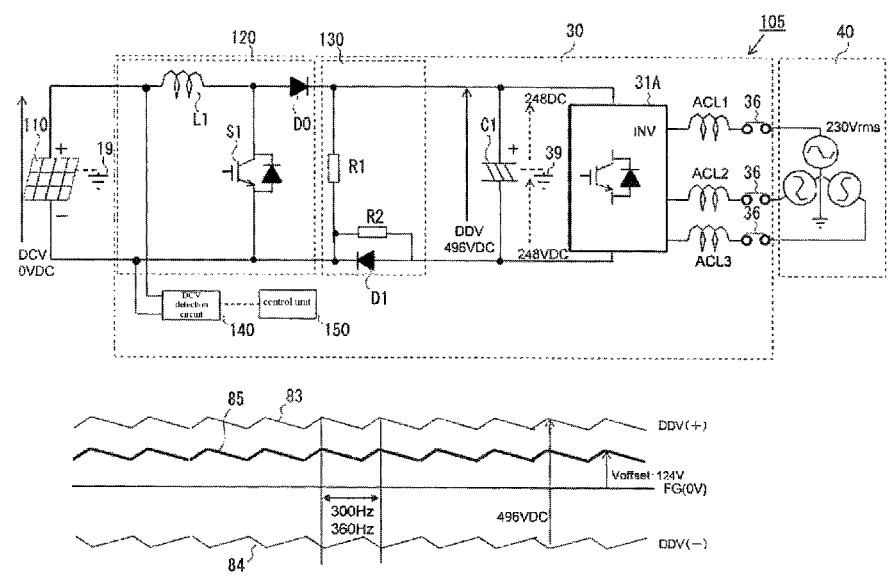
FIG. 17 is a diagram illustrating a state of a power supply system according to Modification Example 1-5 at nighttime.

FIG. 16 is a diagram illustrating a state of a power supply system 105 according to Modification Example 1-5 during the daytime, and FIG. 17 is a diagram illustrating a state of the power supply system 105 according to Modification Example 1-5 at nighttime. The power supply system 105 of Modification Example 1-5 is different from Modification Example 1-3 described above in a configuration connected to a commercial power system of a three-phase four-wire star connection type, and is the same as Modification Example 1-3 in other configurations. Therefore, the same elements as those of Modification Example 1-3 described above are denoted with the same reference numerals and repeated description will be omitted.

The inverter 31A has a configuration in which the number of arms for connection to a three-phase power system is increased, as compared with the inverter 31 in FIGS. 2 and 3, and is the same as the inverter 31 in other respects.

In the power supply system 105 of this example, the voltage DDV between the positive and negative electrodes of the inverter 31 is set to 600 VDC during the daytime, and the ground voltage of the negative electrode in the solar cell 110 is −300 VDC.

When the inverter 31A is gate-blocked at nighttime, the power supply system 105 of this example supplies the power of the commercial power system via the inverter 31, and as illustrated in FIG. 17, the potential 83 of the positive electrode and the potential 84 of the negative electrode in the inverter 31 have a ripple that is derived from the AC power on the commercial power system side, and the voltage DDV therebetween is 496 VDC.

This voltage DDV is divided by the resistors R1 and R2 of the potential adjustment device 130 and the voltage DCV(−) that is applied to the negative electrode of the solar cell 110 is $\sqrt{2} \times \sqrt{3} 230$ VAC×(R2/(R1+R2)−0.5)=125 VDC. In this example, R1=⅓×R2. In this case, the voltage DCV(−) has a ripple that is derived from the AC power on the commercial power system side as indicated by reference numeral 85 in FIG. 17.

Thus, this power supply system 105 of Modification Example 1-5 can prevent the progression of performance degradation due to PID by setting the ground potential of the negative electrode in the solar cell 110 to positive at nighttime, as in Modification Example 1-1 described above.

Modification Example 1-6

Figure 18:
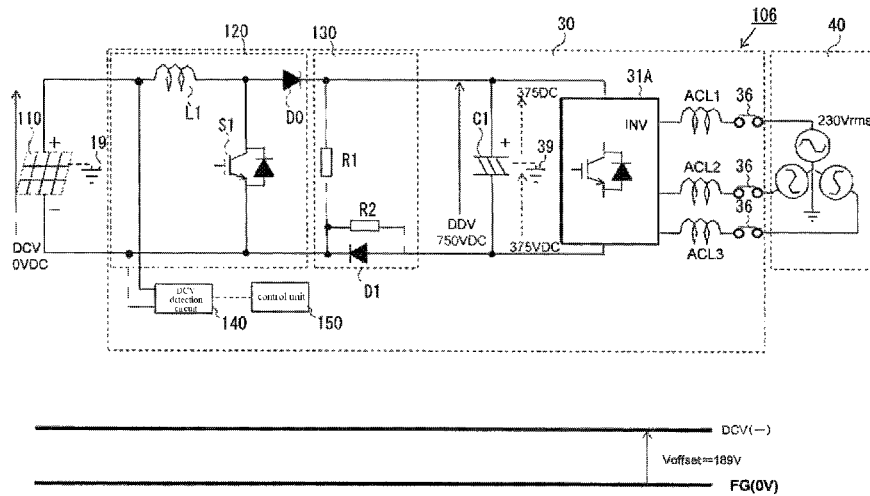
FIG. 18 is a diagram illustrating a circuit configuration of a power supply system according to Modification Example 1-6.

FIG. 18 is a diagram illustrating a circuit configuration of a power supply system 108 according to Modification Example 1-6. Modification Example 1-6 is different from Modification Example 1-4 described above in a configuration connected to a commercial power system of a three-phase four-wire star connection type, and is the same as Modification Example 1-4 in other configurations. Therefore, the same elements as those of Modification Example 1-4 described above are denoted with the same reference numerals and repeated description will be omitted.

In the power supply system 106 of this example, when the control unit 150 determines that it is nighttime, the switching element S1 is stopped, the AC power of the commercial power system is converted into DC power by the inverter 31A, and the voltage DDV between the positive and negative electrodes of the inverter 31A is, for example, 750 VDC.

This voltage DDV is divided by the resistors R1 and R2 of the potential adjustment device 130 and the voltage DCV(−) that is applied to the negative electrode of the solar cell 110 is 750 VAC×(R2/(R1+R2)−0.5)=189 VDC. In this example, R1=⅓×R2.

In the power supply system 102 of this example, since the inverter 31A is operated to convert the AC power into DC power, a voltage 86 that does not substantially fluctuate can be obtained as illustrated in FIG. 18.

Thus, this power supply system 106 of Modification Example 1-6 can prevent the progression of performance degradation due to PID by setting the ground potential of the negative electrode in the solar cell 110 to positive at nighttime, as in Modification Example 1-2 described above.

Modification Example 1-7

Figure 19:
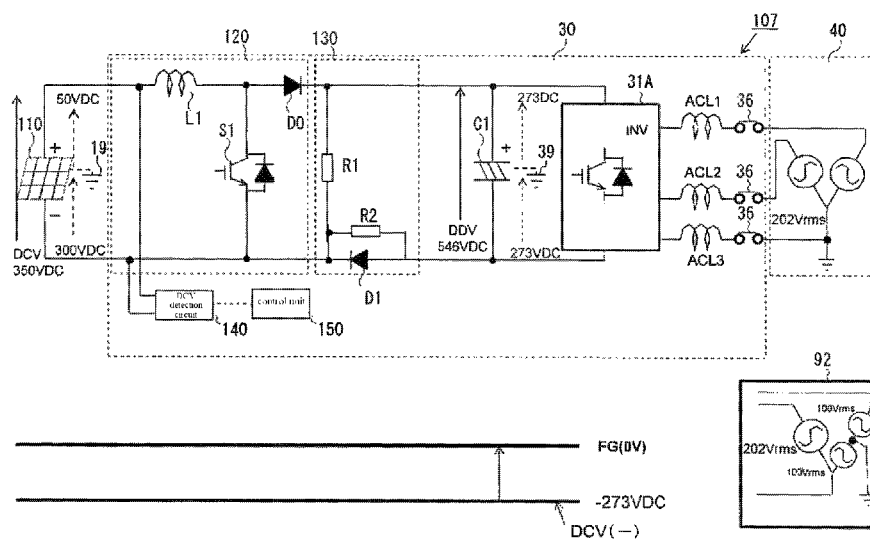
FIG. 19 is a diagram illustrating a state of a power supply system according to Modification Example 1-7 during the daytime.
Figure 20:
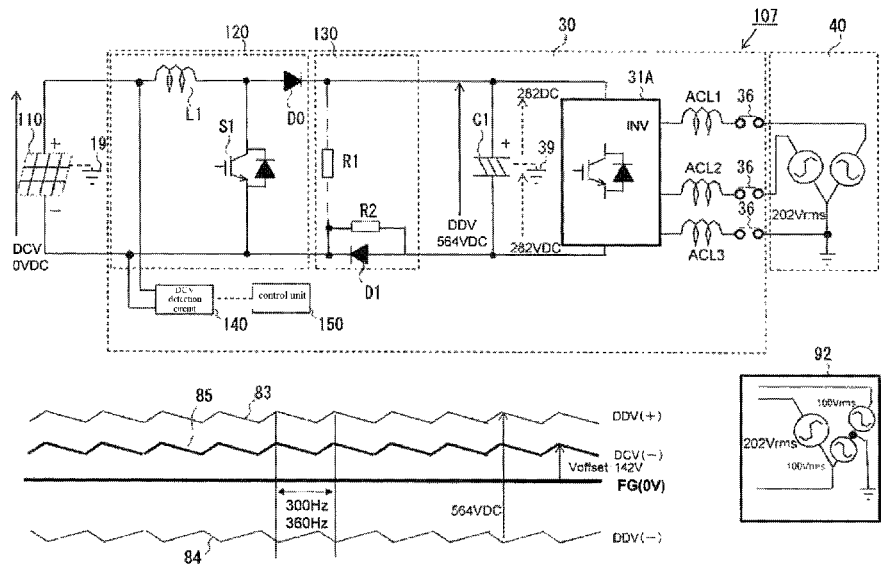
FIG. 20 is a diagram illustrating a state of a power supply system according to Modification Example 1-7 at nighttime.

FIG. 19 is a diagram illustrating a state of the power supply system 107 according to Modification Example 1-7 during the daytime, and FIG. 20 is a diagram illustrating a state of the power supply system 107 according to Modification Example 1-7 at nighttime. The power supply system 107 of Modification Example 1-7 is different from Modification Example 1-5 described above in a configuration connected to a commercial power system of a three-phase V connection type, and is the same as Modification Example 1-5 in other configurations. Therefore, the same elements as those of Modification Example 1-5 are denoted with the same reference numerals and repeated description will be omitted.

In the power supply system 107 of this example, the voltage DDV between the positive and negative electrodes of the inverter 31 is set to 546 VDC during the daytime, and the ground voltage to the negative electrode in the solar cell 110 is −300 VDC, as illustrated in FIG. 19.

When the inverter 31A is gate-blocked at nighttime, the power supply system 107 of this example supplies the power of the commercial power system via the inverter 31A, and as illustrated in FIG. 20, the potential 83 of the positive electrode and the potential 84 of the negative electrode in the inverter 31 have a ripple that is derived from the AC power on the commercial power system side, and the voltage DDV therebetween is 564 VDC.

This voltage DDV is divided by the resistors R1 and R2 of the potential adjustment device 130 and the voltage DCV(−) that is applied to the negative electrode of the solar cell 110 is $\sqrt{2} \times \sqrt{3} \times 230$ VAC×(R2/(R1+R2)−0.5)=142 VDC. In this example, R1=⅓×R2. In this case, the voltage DCV(−) has a ripple that is derived from the AC power on the commercial power system side as indicated by reference numeral 85 in FIG. 20.

Thus, this power supply system 107 of Modification Example 1-7 can prevent the progression of performance degradation due to the PID by setting the ground potential of the negative electrode in the solar cell 110 to positive at nighttime, as in Modification Example 1-5 described above. The V connection is not limited to the same-capacity V connection, and the power supply system 108 of this example may be connected to a different-capacity V connection as indicated by reference numeral 92.

Modification Example 1-8

Figure 21:
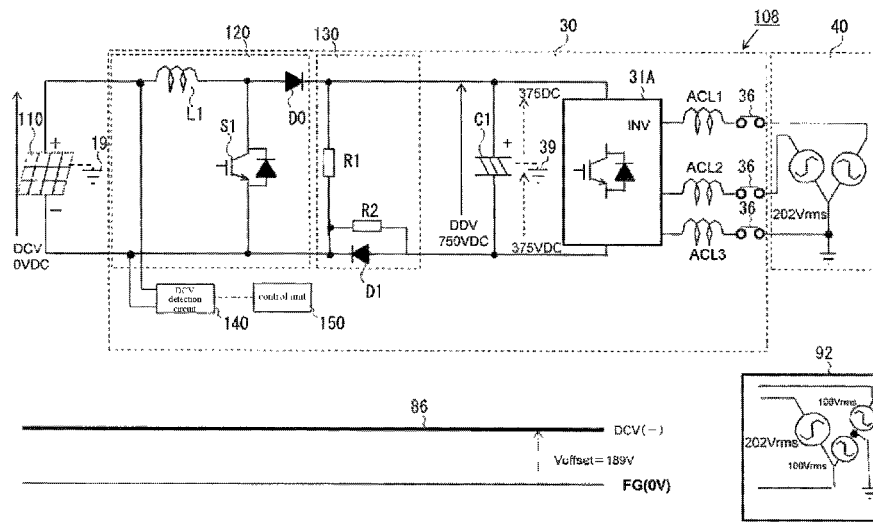
FIG. 21 is a diagram illustrating a circuit configuration of a power supply system according to Modification Example 1-8.

FIG. 21 is a diagram illustrating a circuit configuration of a power supply system 108 according to Modification Example 1-8. Modification Example 1-8 is different from Modification Example 1-6 described above in a configuration connected to a commercial power system of a three-phase V connection type, and is the same in other configurations. Therefore, the same elements as those of Modification Example 1-6 are denoted with the same reference numerals and repeated description will be omitted.

In the power supply system 108 of this example, when the control unit 150 determines that it is nighttime, the switching element S1 is stopped, the AC power of the commercial power system is converted into DC power by the inverter 31A, and the voltage DDV between the positive and negative electrodes of the inverter 31A is, for example, 750 VDC.

This voltage DDV is divided by the resistors R1 and R2 of the potential adjustment device 130 and the voltage DCV(−) that is applied to the negative electrode of the solar cell 110 is 750 VAC×(R2/(R1+R2)−0.5)=189 VDC. In this example, R1=⅓×R2.

In the power supply system 108 of this example, since the inverter 31A is operated to convert the AC power into DC power, a voltage 86 that does not substantially fluctuate can be obtained as illustrated in FIG. 21.

Thus, this power supply system 108 of Modification Example 1-8 can prevent the progression of performance degradation due to PID by setting the ground potential of the negative electrode in the solar cell 110 to positive at nighttime, as in Modification Example 1-6 described above.

The V connection is not limited to the same-capacity V connection, and the power supply system 108 of this example may be connected to a different-capacity V connection as indicated by reference numeral 92.

Embodiment 2

Figure 22:
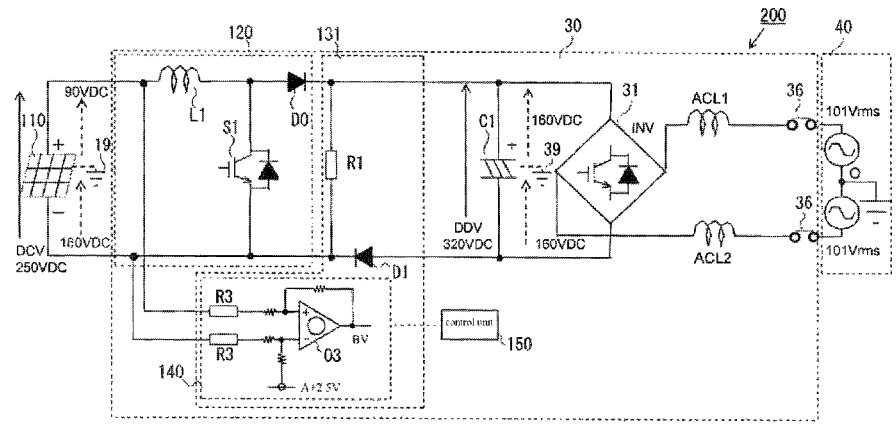
FIG. 22 is a diagram illustrating a circuit configuration of a power supply system according to Embodiment 2.

FIG. 22 is a diagram illustrating a circuit configuration of a power supply system 200 according to Embodiment 2. The power supply system 200 of Embodiment 2 is different from Embodiment 1 described above in a configuration of a circuit that divides the voltage DDV between the positive and negative electrodes, and is the same as Embodiment 1 in other configurations. Therefore, in Embodiment 2, the same elements as those in Embodiment 1 described above are denoted with the same reference numerals, and repeated description will be omitted. In Embodiment 1 described above, the example in which the voltage is divided by the resistors R1 and R2 of the potential adjustment device 130 has been shown, whereas in place of this, the voltage is divided by the DCV detection circuit 140 and the resistor R1 in this example. That is, in this embodiment, the DCV detection circuit 140, the resistor R1, and the diode D1 constitute the potential adjustment device 131.

The power supply system 200 of Embodiment 2 includes the DCV detection circuit 140 that detects DC voltage at both ends of the solar cell 110. The DCV detection circuit 140 includes resistors R3 and an operational amplifier O3. The operational amplifier O3 has a positive input terminal connected to the positive electrode of the solar cell 110 via the resistor R3, and a negative input terminal connected to the negative electrode of the solar cell 110 via the resistor R3, compares the voltage DCV between the positive and negative electrodes of the solar cell 110 with a reference voltage, and outputs a measurement result based on the difference. Although omitted in FIG. 22, the negative electrode of the operational amplifier O3 is connected to the negative electrode of the DC-side input end of the inverter 31 and the anode of the diode D1, and the resistor R3 of the DCV detection circuit 140 is connected in parallel to the diode D1 in a circuit arrangement.

In the power supply system 200 of this example, when the inverter 31 is gate-blocked at nighttime, the voltage DDV is applied between the DC-side positive and negative electrodes of the inverter 31 by the power of the commercial power system via the inverter 31, and this voltage DDV is set to 286 VDC.

This voltage DDV is divided by the resistors R1 and R3 of the potential adjustment device 130, and the voltage DCV(−) is applied to the negative electrode of the solar cell 110. This voltage DCV(−) is determined by a ratio of the resistors R1 and R3. In this example, R1=⅓×R3. The value of the voltage DCV(−) is obtained by the following equation.

$$RA = R3/2$$

$$DCV(-) = \sqrt{2} \times 230\ VAC \times (R2/(R1+R2) - 0.5)$$

Thus, the power supply system 200 of Embodiment 2 can prevent progression of performance degradation due to the PID by setting the ground potential of the negative electrode in the solar cell 110 to positive at nighttime while suppressing the number of components using the resistors of the DCV detection circuit as the potential adjustment device.

Although the example in which the resistance of the DCV detection circuit 140 has been used in place of the resistor R2 in Embodiment 1 described above in Embodiment 2, the same can apply to Modification Examples 1-1 to 1-8 described above.

Modification Example 2-1

Figure 23:
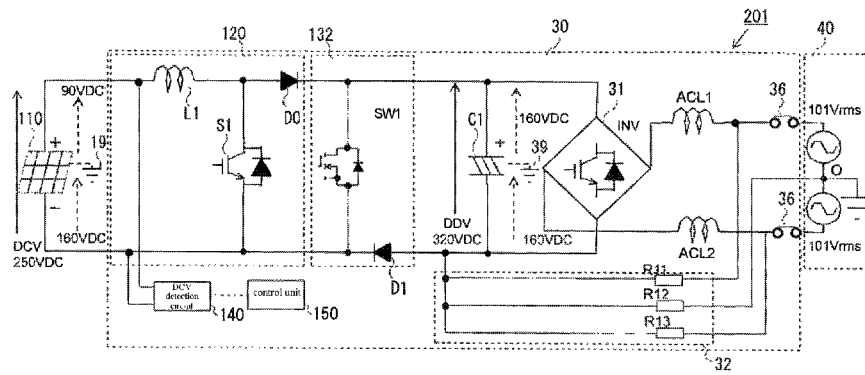
FIG. 23 is a diagram illustrating a circuit configuration of a power supply system according to Modification Example 2-1.

FIG. 23 is a diagram illustrating a circuit configuration of a power supply system 201 according to Modification Example 2-1. Modification Example 2-1 is different from Embodiment 2 described above in a configuration of the potential adjustment device and is the same as Embodiment 2 in other configurations. Therefore, the same elements as those of Embodiment 2 described above are denoted with the same reference numerals and repeated description will be omitted.

The potential adjustment device 132 of this example includes a switch SW1 and a diode D1. The switch SW1 may be a switch that can switch between ON/OFF according to a determination of daytime or nighttime, such as a semiconductor switch or a relay (mechanical switch). The switch SW1 is connected between the positive and negative electrodes in parallel to the switching element S1.

In Embodiments 1 and 2 described above, it is necessary to reduce the value of the resistor R1 in order to increase the ground voltage DCV(−) of the negative electrode of the solar cell 110, and power consumption at daytime increases.

Therefore, in this example, the switch SW1 is used in place of the resistor R1 of Embodiments 1 and 2, the switch SW1 is turned OFF at daytime to suppress power consumption, the switch SW1 is turned ON at nighttime, and the voltage DDV is divided by the impedance of the switch SW1 and the diode D1.

When the inverter 31 is gate-blocked at nighttime, the power supply system 201 of this example applies the voltage DDV between the DC-side positive and negative electrodes of the inverter 31 using the power of the commercial power system via the inverter 31 and sets this voltage DDV to 286 VDC.

This voltage DDV is divided by impedance of the switch SW1 and the diode D1 of the potential adjustment device 132, and the voltage DCV(−) is applied to the negative electrode of the solar cell 110. In this example, the value of the voltage DCV(−) is DDV/2=143 VDC.

Thus, the power supply system 201 of this example can suppress the power consumption at daytime and prevent progression of the performance degradation due to the PID at nighttime by turning the switch SW1 OFF at daytime and OFF only at nighttime using the switch SW1 as the potential adjustment device to adjust the potential.

Modification Example 2-2

Figure 24:
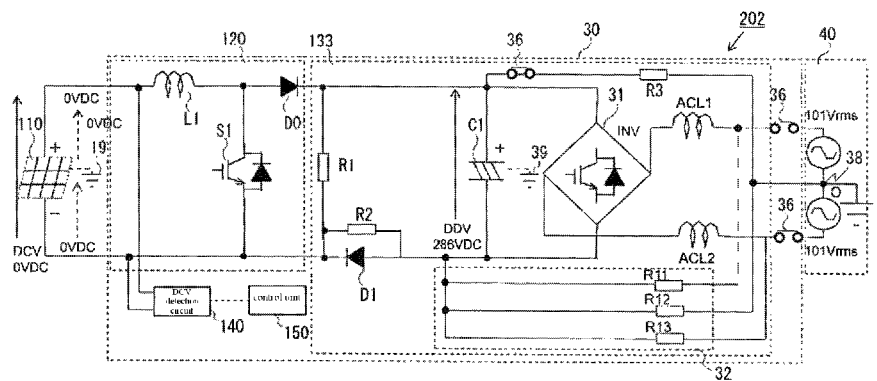
FIG. 24 is a diagram illustrating a circuit configuration of a power supply system according to Modification Example 2-2.

FIG. 24 is a diagram illustrating a circuit configuration of a power supply system 202 according to Modification Example 2-2. Modification Example 2-2 is different from Embodiment 2 described above in a configuration of the potential adjustment device and is the same as Embodiment 2 in other configurations. Therefore, the same elements as those of Embodiment 2 described above are denoted with the same reference numerals and repeated description will be omitted.

The potential adjustment device 133 of this example includes a resistor R3, in addition to the resistors R1 and R2 and uses impedance of the gate-blocked inverter 31 for adjustment of the potential. The resistor R3 has one end connected to the O phase (frame ground) 38, and the other end connected to the DC-side positive electrode of the inverter 31.

FIG. 25 is a diagram illustrating an example of the inverter 31 and the AC voltage measurement circuit 32 in Modification Example 2-2. As illustrated in FIG. 25, a bridge is configured in the inverter 31, for example, by switching elements S2 to S5 and freewheeling diodes D2 to D5. Further, the AC voltage measurement circuit 32 includes, for example, operational amplifiers O1 and O2, compares a voltage between an output end 34 and a frame ground 38 and a voltage between an output end 35 and the frame ground 38 with a reference voltage Vref, and outputs a difference therebetween as a measurement result.

When the switching elements S2 to S5 are gate-blocked at nighttime, the inverter 31 functions as a diode bridge, and a circuit M1 indicated by a dash-dotted line passing through the operational amplifier O1, the diode D4, and the reactor ACL1 is configured, and the power of the commercial power system is supplied from the output end 34 and the frame ground 38 to the circuit M1. Further, a circuit M2 indicated by a two-dot chain line passing through the operational amplifier O2, the diode D5, and the reactor ACL2 is configured, and the power of the commercial power system is supplied from the output end 35 and the frame ground 38 to the circuit M2. The frame ground 38 and the DC-side positive electrode of the inverter 31 are connected via the resistor R3.

FIG. 26 is a diagram illustrating an equivalent circuit of the circuits M1 and M2. In the power supply system 202, the potential of the frame ground 38 is DDV/2 and the potential of DCV(−) is determined by voltage division resistors R1 and R2.

In the examples of FIGS. 24 to 26, the voltage DDV is √2202 VAC=286 VDC, and the voltage DCV(−) that is applied to the negative electrode of the solar cell 110 is DDV×(R2/(R1+R2)−0.5) as indicated by a reference sign 86 in FIG. 24.

Thus, the power supply system 202 of this example can prevent the progression of performance degradation due to the PID by setting the ground potential of the negative electrode in the solar cell 110 to positive at nighttime.

Embodiment 3

Figure 27:
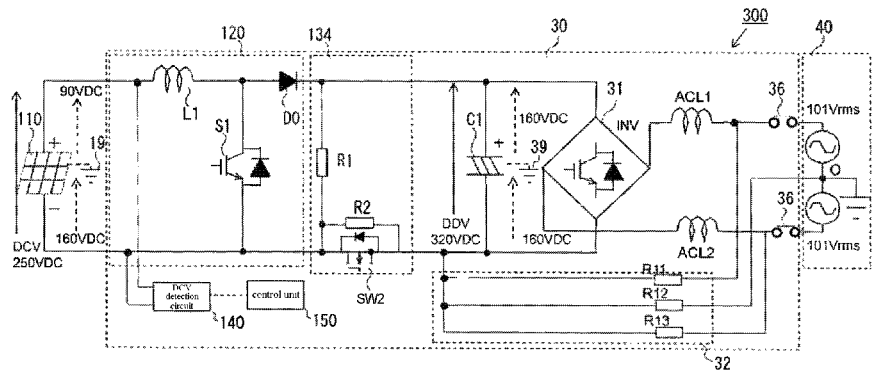
FIG. 27 is a diagram illustrating a circuit configuration of a power supply system according to Embodiment 3.

FIG. 27 is a diagram illustrating a circuit configuration of a power supply system 300 according to Embodiment 3. The power supply system 300 of Embodiment 3 is different from that of Embodiment 1 described above in a configuration of a switching circuit that switches between a state at nighttime and a state at daytime, and is the same as that of Embodiment 1 in other configurations. Therefore, in Embodiment 3, the same elements as those in Embodiment 1 described above are denoted with the same reference numerals, and repeated description will be omitted. In Embodiment 1 described above, the diode D1 is included in parallel to the resistor R2 as the switching circuit of the potential adjustment device 130. Instead, the potential adjustment device 134 of this example includes the switch SW2. The switch SW2 may be a switch in which ON/OFF can be switched according to a determination of daytime or nighttime, such as a semiconductor switch or a relay (mechanical switch). The switch SW2 is connected in parallel to the resistor R2.

In Embodiments 1 and 2 described above, the diode D1 of the potential adjustment device 130 is connected to a line on the negative electrode side, and a loss of power at daytime occurs when the power passes through the diode D1. Accordingly, it is desirable to reduce the loss of the power.

Therefore, in this example, the switch SW2 is used in place of the diode D1 of Embodiments 1 and 2, the switch SW2 is turned ON at daytime so that power is passed through without substantially causing a loss, and the switch SW2 is turned OFF at nighttime so that the power passes through the resistor R2.

In the power supply system 300 of this example, when the inverter 31 is gate-blocked at nighttime, the voltage DDV based on the power of the commercial power system is applied between the DC-side positive and negative electrodes of the inverter 31 via the inverter 31, and the voltage DDV is set to 286 VDC.

This voltage DDV is divided by the resistor R1 and the resistor R2 of the potential adjustment device 132, and the voltage DCV(−) is applied to the negative electrode of the solar cell 110. In this example, the value of the voltage DCV(−) is $$DDV/2=143\ \text{VDC}.$$

Thus, the power supply system 300 of this example can suppress a loss of power passing through the switching circuit at daytime and prevent progression of the performance degradation due to the PID at nighttime by turning the switch SW2 used as a switching circuit of the potential adjustment device ON at daytime and turning the switch SW2 OFF at nighttime.

Although the switch SW2 has been used in place of the diode D1 of Embodiment 1 described above in Embodiment 3, The same can apply to Modification Examples 1-1 to 1-8, Embodiment 2, and Modification Examples 2-1 to 2-2 described above.

Modification Example 3-1

Figure 28:
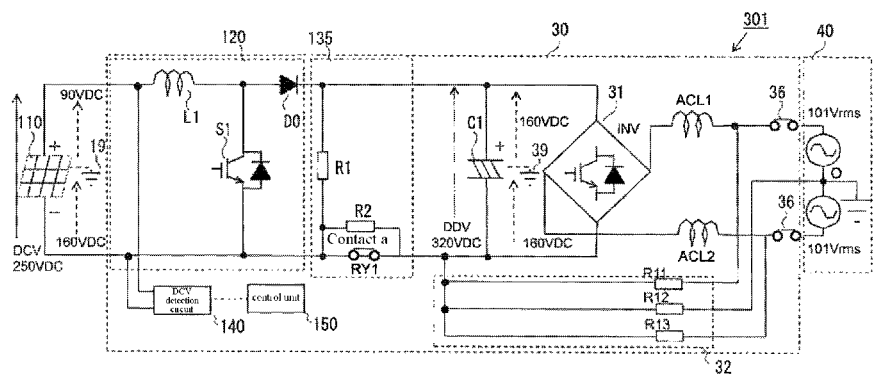
FIG. 28 is a diagram illustrating a circuit configuration of a power supply system according to Modification Example 3-1.

FIG. 28 is a diagram illustrating a circuit configuration of a power supply system 301 according to Modification Example 3-1. Modification Example 3-1 is different from Embodiment 3 described above in configuration in which a relay RY1 has been used as a switching circuit, and is the same as Embodiment 3 in other configurations. Therefore, the same elements as those of Embodiment 3 described above are denoted with the same reference numerals, and repeated description will be omitted.

The potential adjustment device 135 of this example includes resistors R1 and R2 and a relay RY1. The relay RY1 is connected in parallel to the resistor R2.

Thus, the power supply system 301 of this example can suppress a loss of power passing through the switching circuit at daytime and prevent progression of the performance degradation due to the PID at nighttime by turning the relay RY1 with a contact b used as a switching circuit of the potential adjustment device OFF at daytime and turning the relay RY1 OFF at nighttime.

Modification Example 3-2

Figure 29:
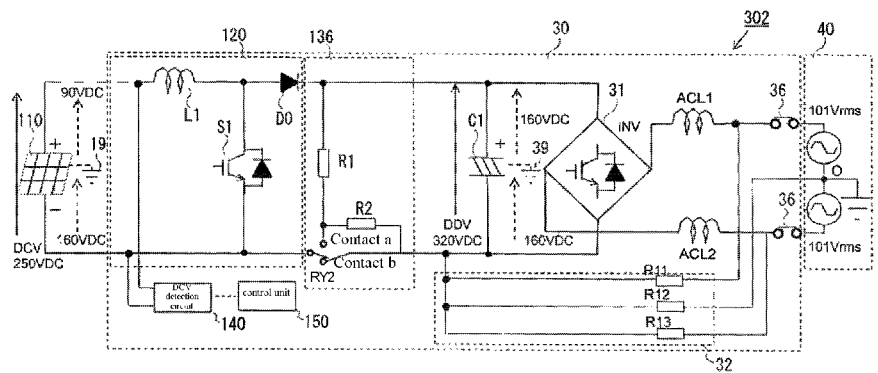
FIG. 29 is a diagram illustrating a circuit configuration of a power supply system according to Modification Example 3-2.

FIG. 29 is a diagram illustrating a circuit configuration of a power supply system 302 according to Modification Example 3-2. Modification Example 3-2 is different from Embodiment 3 described above in a configuration in which a three-terminal relay RY2 has been used as the switching circuit, and is the same as Embodiment 3 in other configurations. Therefore, the same elements as those of Embodiment 3 described above are denoted with the same reference numerals, and repeated description will be omitted.

The potential adjustment device 136 of this example includes resistors R1 and R2 and the three-terminal relay RY2. As illustrated in FIG. 29, in the power supply system 302 of this modification example 3-2, one end of the resistor R1 is connected to the positive electrode at the output end of the DC/DC converter 120, and the other end of the resistor R1 is connected to contact a of the three-terminal relay 52.

The three-terminal relay RY2 has a common terminal connected to the negative electrode of the DC/DC converter 120, and a contact b connected to the negative electrode of the inverter 31. The resistor R2 has one end connected to the b-contact of the three-terminal relay RY2, and the other end connected to the negative electrode of the inverter 31.

In the three-terminal relay RY2, switching between the contacts is controlled by the control unit 150. For example, at daytime, the contact a is opened and the contact b is closed such that the negative electrode of the solar cell 110 and the negative electrode of the inverter 31 are connected. Further, the three-terminal relay RY2 is controlled by the control unit 150 so that the contact b is opened and the contact a is closed at nighttime such that one end of the resistor R1 and one end of the resistor R2 are connected to the negative electrode of the solar cell 110, and a voltage divided by the resistors R1 and R2 is applied to the negative electrode of the solar cell 110.

Thus, the power supply system 302 of this modification example 3-2 can prevent the progression of performance degradation due to the PID by setting the ground potential of the negative electrode in the solar cell 110 to positive at nighttime, as in Embodiment 3 described above.

Modification Example 3-3

Figure 30:
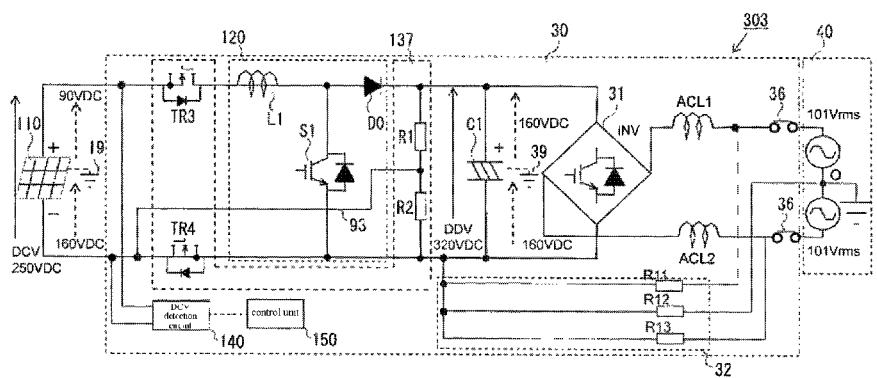
FIG. 30 is a diagram illustrating a circuit configuration of a power supply system according to Modification Example 3-3.

FIG. 30 is a diagram illustrating a circuit configuration of a power supply system 303 according to Modification Example 3-3. Modification Example 3-3 is different from Embodiment 3 described above in a configuration in which semiconductor switches TR3 and TR4 are used as the switching circuit, and is the same as Embodiment 3 in other configurations. Therefore, the same elements as those of Embodiment 3 described above are denoted with the same reference numerals, and repeated description will be omitted.

Potential adjustment device 137 of this example includes resistors R1 and R2 and semiconductor switches TR3 and TR4. As illustrated in FIG. 30, in the power supply system 302 of this modification example 3-2, the resistor R1 and the resistor R2 are connected in series between positive and negative electrodes at the output end of the DC/DC converter 120.

The semiconductor switch TR3 is connected between a positive electrode of the solar cell 110 and a positive electrode on the input side of the DC/DC converter 120, and the semiconductor switch TR4 is connected between a negative electrode of the solar cell 110 and a negative electrode on the input side of the DC/DC converter 120. Further, a point between the resistor R1 and the resistor R2 and the negative electrode of the solar cell 110 are connected by a line 93.

Switching between ON and OFF of the semiconductor switches TR3 and TR4 is controlled by a control unit 150. For example, the semiconductor switches TR3 and TR4 are turned ON at daytime to connect the solar cell 110 to the DC/DC converter 120, and the semiconductor switches TR3 and TR4 are turned OFF at nighttime to disconnect the solar cell 110 from the DC/DC converter 120.

Further, in the power supply system 303, when an inverter 31 is gate-blocked at nighttime, a voltage DDV is applied between the DC-side positive and negative electrodes of the inverter 31 by power of the commercial power system via the inverter 31, and this voltage DDV is set to 286 VDC. This voltage DDV is divided by the resistors R1 and R2 of the potential adjustment device 137, and a positive voltage DCV(-) is applied to the negative electrode of the solar cell 110 via the line 93.

Thus, in the power supply system 303 of this example can prevent progression of performance degradation due to the PID by setting the potential of the negative electrode of the solar cell 110 to positive at nighttime.

Embodiment 4

Figure 31:
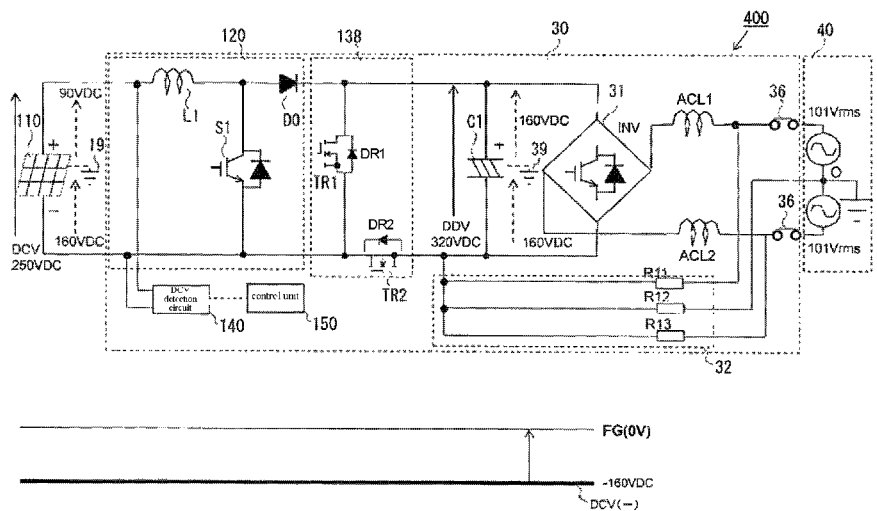
FIG. 31 is a diagram illustrating a state of a power supply system according to Embodiment 4 during the daytime.
Figure 32:
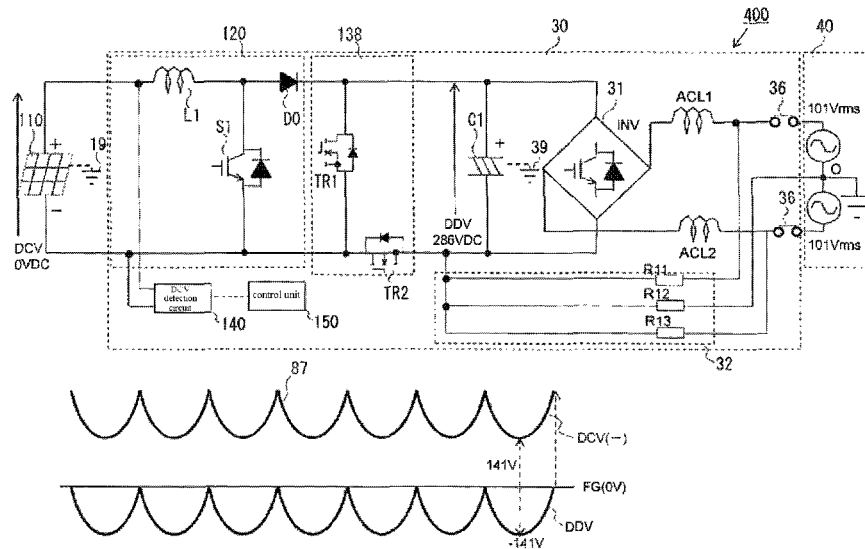
FIG. 32 is a diagram illustrating a state of the power supply system according to Embodiment 4 at nighttime.

FIG. 31 is a diagram illustrating a state at daytime of a power supply system 400 according to Embodiment 4, and FIG. 32 is a diagram illustrating a state at nighttime of the power supply system 400 according to Embodiment 4. The power supply system 400 of Embodiment 4 is different from that of Embodiment 3 described above in a configuration of the potential adjustment device, and is the same as that of Embodiment 3 in other configurations. Therefore, in Embodiment 4, the same elements as those in Embodiment 3 described above are denoted with the same reference numerals, and repeated description will be omitted. In Embodiment 3, the switch TR2 is included as the switching circuit of the potential adjustment device 137 and the resistors R1 and R2 are included as a voltage division circuit, whereas the potential adjustment device 138 of this example includes two switches TR1 and TR2. The switches TR1 and TR2 may be switches of which ON and OFF can be switched between according to a determination of daytime or nighttime, such as semiconductor switches or relays (mechanical switches).

The switch TR1 is connected between the positive and negative electrodes in parallel to a switching element S1. The switch TR2 is connected between a negative electrode side end of the switch TR1 and a negative electrode of the inverter 31. Further, the switches TR1 and TR2 include freewheeling diodes DR1 and DR2. The freewheeling diode DR1 of the switch TR1 has a cathode connected to the positive electrode and an anode connected to the negative terminal. The freewheeling diode DR2 of the switch TR2 has a cathode connected to the negative electrode of the solar cell 110 and an anode connected to the negative electrode of the inverter 31.

Switching between ON and OFF of the semiconductor switches TR1 and TR2 is controlled by the control unit 150. For example, at daytime, the semiconductor switch TR1 is turned OFF and the semiconductor switch TR2 is turned ON. In this case, an output of the solar cell 110 is boosted by a DC/DC converter 120, converted into AC power by the inverter 31, and output to the commercial power system, as illustrated in FIG. 31.

On the other hand, at nighttime, the semiconductor switch TR1 is turned ON and the semiconductor switch TR2 is turned OFF. In this case, in the power supply system 400, the inverter 31 is gate-blocked, the voltage DDV is applied between the DC-side positive and negative electrodes of the inverter 31 by the power of the commercial power system via the inverter 31, and the voltage DDV is set to 286 VDC. This voltage DDV is divided by impedance of the switch TR1 in the ON state and the impedance of the switch TR2

(the freewheeling diode DR2) in the OFF state and, as illustrated in FIG. 32, a voltage 87 that is positive with respect to a frame ground 38 is applied to the negative electrode of the solar cell 110, and a potential of the negative electrode is maintained to be positive.

Thus, in the power supply system 400 of this example can prevent progression of performance degradation due to the PID by setting the potential of the negative electrode of the solar cell 110 to positive at nighttime.

Modification Example 4-1

Figure 33:
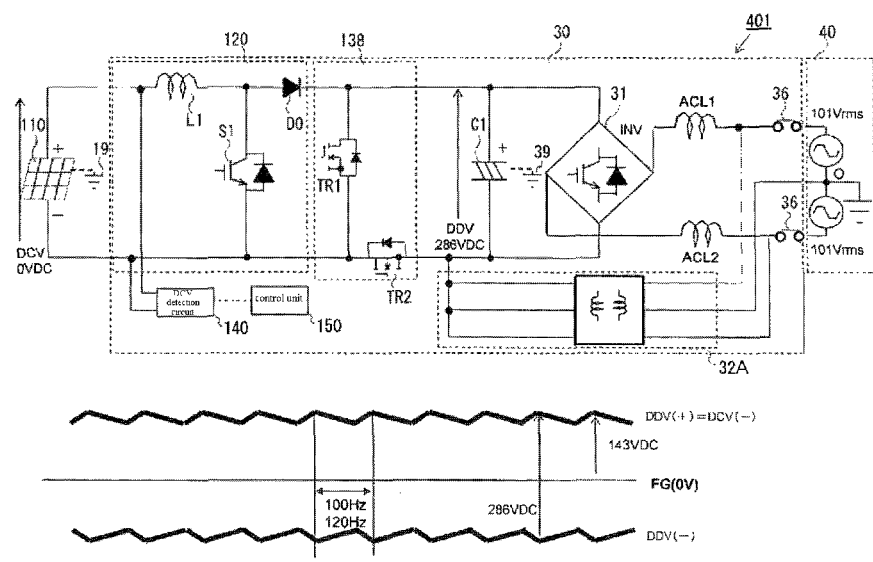
FIG. 33 is a diagram illustrating a circuit configuration of a power supply system according to Modification Example 4-1.

FIG. 33 is a diagram illustrating a circuit configuration of a power supply system 401 according to Modification Example 4-1. Modification Example 4-1 is different from Embodiment 4 described above in that the AC voltage measurement circuit is of an insulating type, and is the same as Embodiment 4 in the other configurations. Therefore, the same elements as those of Embodiment 4 are denoted with the same reference numerals, and repeated description will be omitted.

An AC voltage measurement circuit 32A of this example includes a transformer or an isolation amplifier and insulates a DC circuit side from a power system side. In the power supply system 401 of this example, when power of the commercial power system is supplied via the inverter 31 in a state in which the inverter 31 is gate-blocked, a potential 83 of the positive electrode and a potential 84 of the negative electrode in the inverter 31 have ripples derived from AC power on the commercial power system side, and a voltage DDV between the potentials is 286 VDC, as illustrated in FIG. 33.

This voltage DDV is divided by the switches TR1 and TR2 of the potential adjustment device 138, and a positive voltage is applied to the negative electrode of the solar cell 110.

Thus, this power supply system 401 of Modification Example 4-1 can perform necessary recovery and prevent progression of the performance degradation due to the PID by setting the ground potential of the negative electrode in the solar cell 110 to positive at nighttime.

Modification Example 4-2

Figure 34:
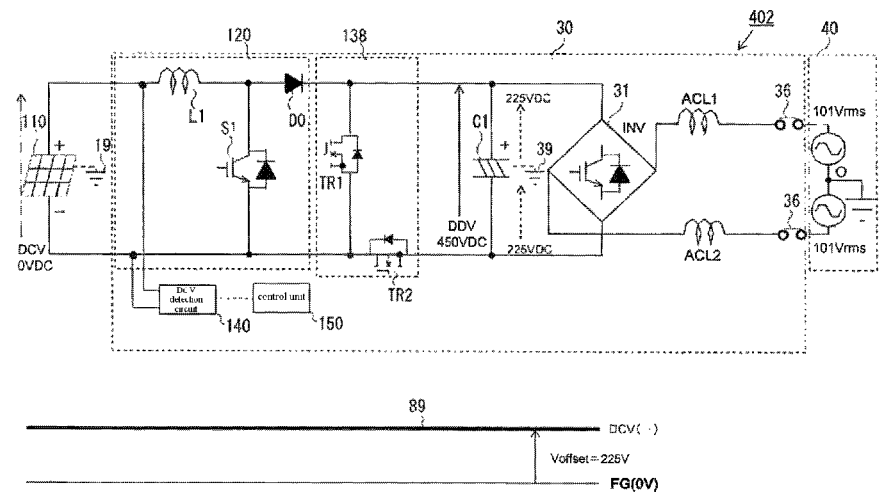
FIG. 34 is a diagram illustrating a circuit configuration of a power supply system according to Modification Example 4-2.

FIG. 34 is a diagram illustrating a circuit configuration of a power supply system 402 according to Modification Example 4-2. Modification Example 4-2 is different from Embodiment 4 described above in a configuration in which the inverter 31 is caused to operate and converts the AC power of the commercial power system into DC power and supplies the DC power to the solar cell 110 when the output of the solar cell is smaller than a predetermined value at nighttime or the like, and is the same as Embodiment 4 in other configurations. Therefore, the same elements as those of Embodiment 4 are denoted with the same reference numerals, and repeated description will be omitted.

In the power supply system 402 of this example, when the control unit 150 determines that it is nighttime, the switching element S1 is stopped, and the AC power of the commercial power system is converted into DC power by the inverter 31 such that the voltage DDV between the positive and negative electrodes of the inverter 31 is, for example, 450 VDC.

This voltage DDV is divided by the switches TR1 and TR2 of the potential adjustment device 138 and the positive voltage is applied to the negative electrode of the solar cell 110. In the power supply system 402 of this example, since the inverter 31 is operated to convert the AC power into DC power, a voltage 89 that does not substantially fluctuate can be obtained, as illustrated in FIG. 34.

Thus, the power supply system 402 of this modification example 4-2 can prevent the progression of performance degradation due to the PID by setting the ground potential of the negative electrode in the solar cell 110 to positive (for example, 113 VDC) at nighttime, similar to Embodiment 1 described above.

Embodiment 5

Figure 35:
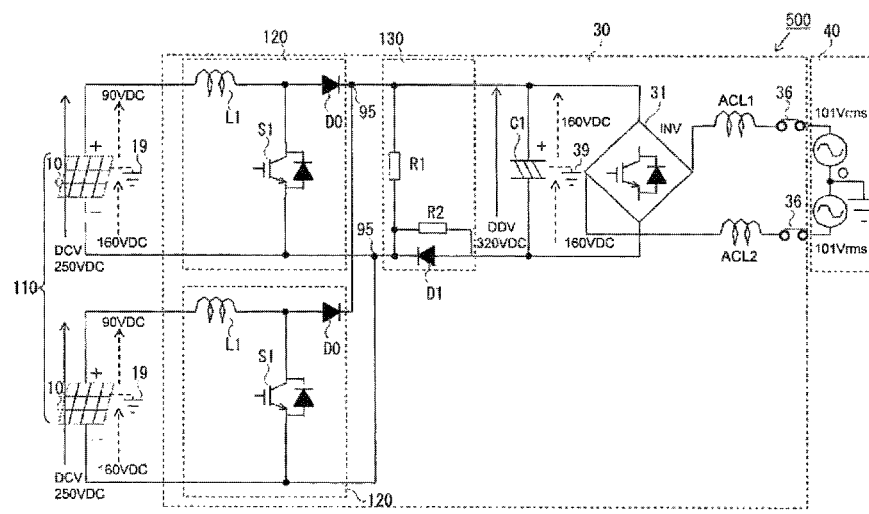
FIG. 35 is a diagram illustrating a configuration of a power supply system according to Embodiment 5.

FIG. 35 is a diagram illustrating a configuration of a power supply system 500 according to Embodiment 5. The power supply system 500 of Embodiment 5 is different from that of Embodiment 1 described above in a configuration in which a plurality of strings of solar cells are included and a string inverter that performs output control is included for each string, and is the same as that of Embodiment 1 in other configurations. Therefore, in Embodiment 5, the same elements as those in Embodiment 1 described above are denoted with the same reference numerals, and repeated description will be omitted. Although two solar cell strings 10 are illustrated in FIG. 35 for convenience, the disclosure is not limited to two solar cell strings and an arbitrary number of solar cell strings can be set.

Each of the plurality of solar cell strings 10 is connected to the DC/DC converter 120, and an output of each solar cell string 10 is converted (boosted) to a predetermined DC voltage. Thus, by converting the output to the predetermined voltage for each solar cell string 10, the output can be converted into the predetermined voltage without waste even when a shadow or a stain occur in some of the solar cell strings 10 and the output of each solar cell string 10 varies.

An output end of the DC/DC converter 120 is connected to the DC-side positive and negative electrodes of the inverter 31, and the output of each DC/DC converter 120 is converted to an AC voltage and output to the commercial power system.

A potential adjustment device 130 is provided between the DC/DC converter 120 and the inverter 31. In this embodiment, the potential adjustment device 130 is provided on the inverter 31 side relative to a connection point 95 of each DC/DC converter 120, such that potentials of the negative electrodes of the plurality of solar cell strings 10 are adjusted in common.

The power supply system 500 of this example sets the voltage DDV between the positive and negative electrodes of the inverter 31 as 320 VDC at daytime, and the ground voltage of the negative electrode in each solar cell string 10 of the solar cell 110 is −160 VDC.

When the inverter 31 is gate-blocked at nighttime, the power supply system 500 of this example applies the voltage DDV between the DC-side positive and negative electrodes of the inverter 31 using the power of the commercial power system via the inverter 31, the voltage DDV is divided by the resistors R1 and R2 of the potential adjustment device 130, a voltage is applied to the negative electrode of each solar cell string 10, and the ground potential of the negative electrode is maintained to be positive.

Thus, the power supply system 500 of this embodiment can prevent the progression of performance degradation due to the PID by setting the ground potential of the negative electrode in the plurality of solar cell strings 10 to positive.

Modification Example 5-1

Figure 36:
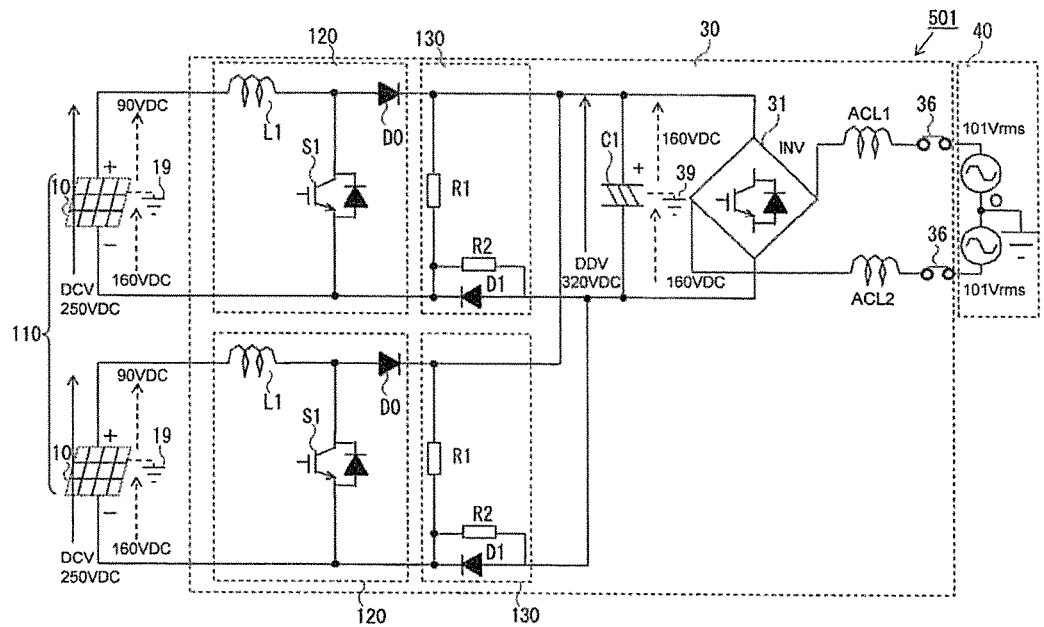
FIG. 36 is a diagram illustrating a circuit configuration of a power supply system according to Modification Example 5-1.

FIG. 36 is a diagram illustrating a circuit configuration of a power supply system 501 according to Modification Example 5-1. Modification Example 5-1 is different from Embodiment 5 described above in the configuration in which potential adjustment device is provided in each of the plurality of DC/DC converters 120, and is the same as Embodiment 5 in other configurations. Therefore, the same elements as those of Embodiment 5 described above are denoted with the same reference numerals, and repeated description will be omitted.

The power supply system 501 of this example sets the voltage DDV between the positive and negative electrodes of the inverter 31 as 320 VDC at daytime, and the ground voltage of the negative electrode in each solar cell string 10 of the solar cell 110 is −160 VDC.

When the inverter 31 is gate-blocked at nighttime, the power supply system 501 of this example applies the voltage DDV between the DC-side positive and negative electrodes of the inverter 31 using the power of the commercial power system via the inverter 31, this voltage DDV is divided by the resistors R1 and R2 of the potential adjustment device 130 provided in each DC/DC converter 120, a voltage is applied to the negative electrode of each solar cell string 10, and the ground potential of the negative electrode is maintained to be positive.

Thus, the power supply system 501 of this example can prevent the progression of performance degradation due to the PID by setting the ground potential of the negative electrode in the plurality of solar cell strings 10 to positive. Further, in the power supply system 501 of this example, since the potential adjustment device 130 is provided in each solar cell string 10, the potential of the negative electrode at nighttime can be appropriately set in each solar cell string 10 even when solar cell strings 10 having a different configuration is included.

Modification Example 5-2

Figure 37:
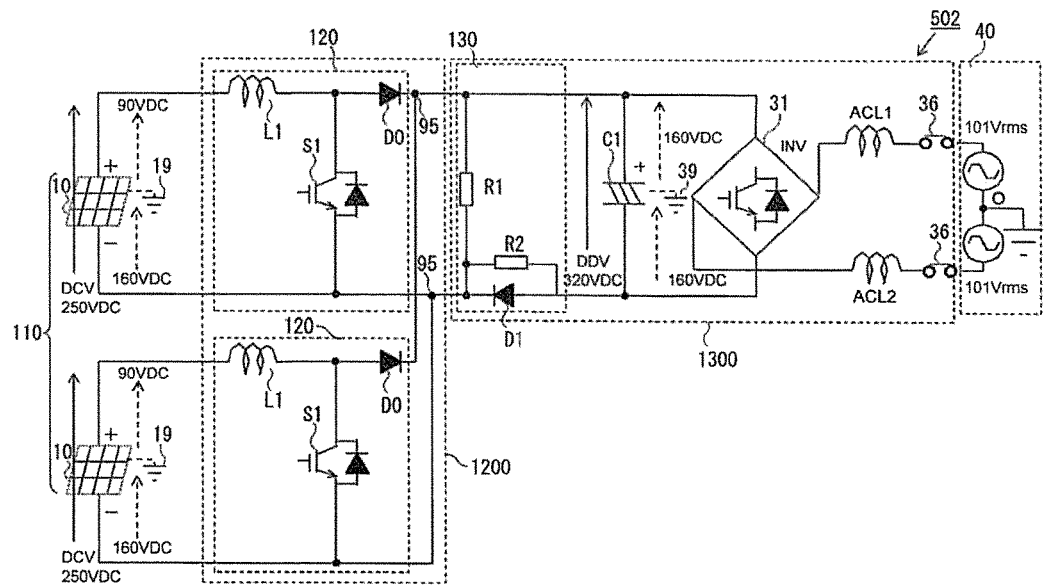
FIG. 37 is a diagram illustrating a circuit configuration of a power supply system according to Modification Example 5-2.

FIG. 37 is a diagram illustrating a circuit configuration of a power supply system 502 according to Modification Example 5-2. The Modification Example 5-2 is different from Embodiment 5 described above in that a DD-less inverter and a string optimizer are included, and is the same as Embodiment 5 in other configurations. Therefore, the same elements as those of Embodiment 5 described above are denoted with the same reference numerals, and repeated description will be omitted.

A string optimizer 1200 includes a plurality of DC/DC converters 120, and is a string optimizer in which, when an output of each DC/DC converter 120 varies due to weather, a state of the solar cell string 10, or the like, each DC/DC converter 120 is controlled so that an output to the DD-less inverter 1300 is optimized.

The DD-less inverter 1300 is a device that converts a DC output input from the string optimizer 1200 into an AC output and outputs the AC output to the commercial power system, and includes a configuration other than the DC/DC converter 120 in the power supply system 500 of Embodiment 5 illustrated in FIG. 35.

The power supply system 502 of this example sets the voltage DDV between the positive and negative electrodes of the inverter 31 as 320 VDC at daytime, and the ground voltage of the negative electrode in each solar cell string 10 of the solar cell 110 is −160 VDC.

When the inverter 31 is gate-blocked at nighttime, the power supply system 502 of this example applies the voltage DDV between the DC-side positive and negative electrodes of the inverter 31 using the power of the commercial power system via the inverter 31, this voltage DDV is divided by the resistors R1 and R2 of the potential adjustment device 130, a voltage is applied to the negative electrode of each solar cell string 10, and the ground potential of the negative electrode is maintained to be positive.

Thus, the power supply system 502 of this example can prevent the progression of performance degradation due to the PID by setting the ground potential of the negative electrode in the plurality of solar cell strings 10 to positive.

Modification Example 5-3

Figure 38:
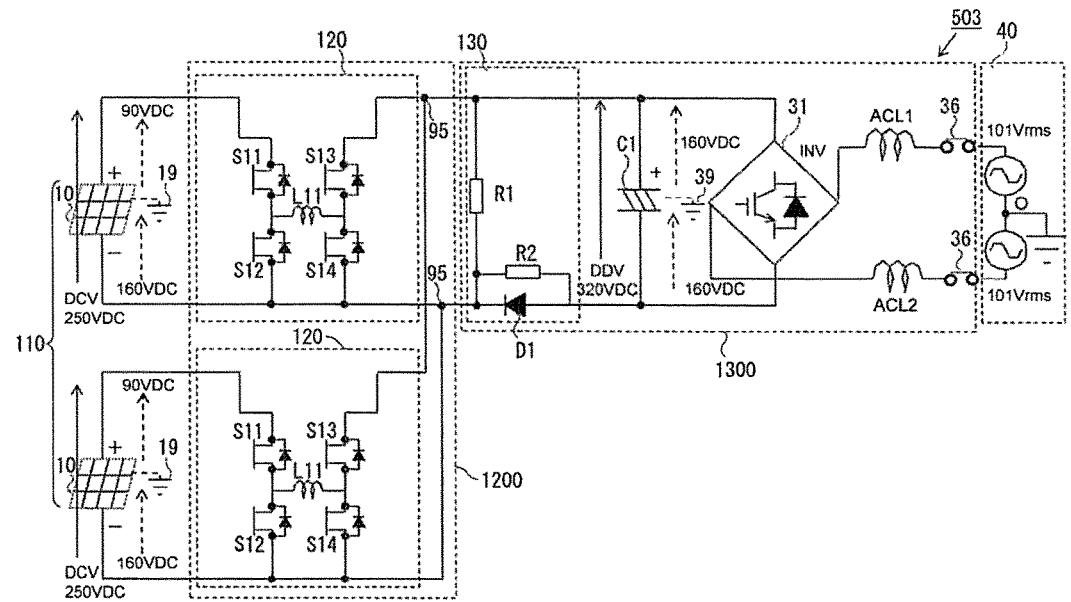
FIG. 38 is a diagram illustrating a circuit configuration of a power supply system according to Modification Example 5-3.

FIG. 38 is a diagram illustrating a circuit configuration of a power supply system 503 according to Modification Example 5-3. Modification Example 5-3 is an example of the DC/DC converter 120 unlike Modification Example 5-2 described above, and is the same as Modification Example 5-2 in other configurations. Therefore, the same elements as those of Modification Example 5-2 described above are denoted with the same reference numerals, and repeated description will be omitted.

In the DC/DC converter 120 of this example, a switching element S11 and a switching element S12 are connected in series between positive and negative electrodes on the input side, and a switching element S13 and a switching element S14 are connected in series between positive and negative electrodes on the output side. A reactor L11 is connected between the switching element S11 and the switching element S12 and between the switching element S13 and the switching element S14. In the DC/DC converter 120 of this example, the negative electrode on the input side and the negative electrode on the output side are connected and are in common.

Thus, since the circuit of the DC/DC converter 120 is configured such that the negative electrode is common, a voltage divided by the potential adjustment device 130 at nighttime is applied to the negative electrode of the solar cell string 10. The configuration of the DC/DC converter 120 is not limited to the configuration of this example, and a configuration in which the negative electrode is common may be adopted.

Modification Example 5-4

Figure 39:
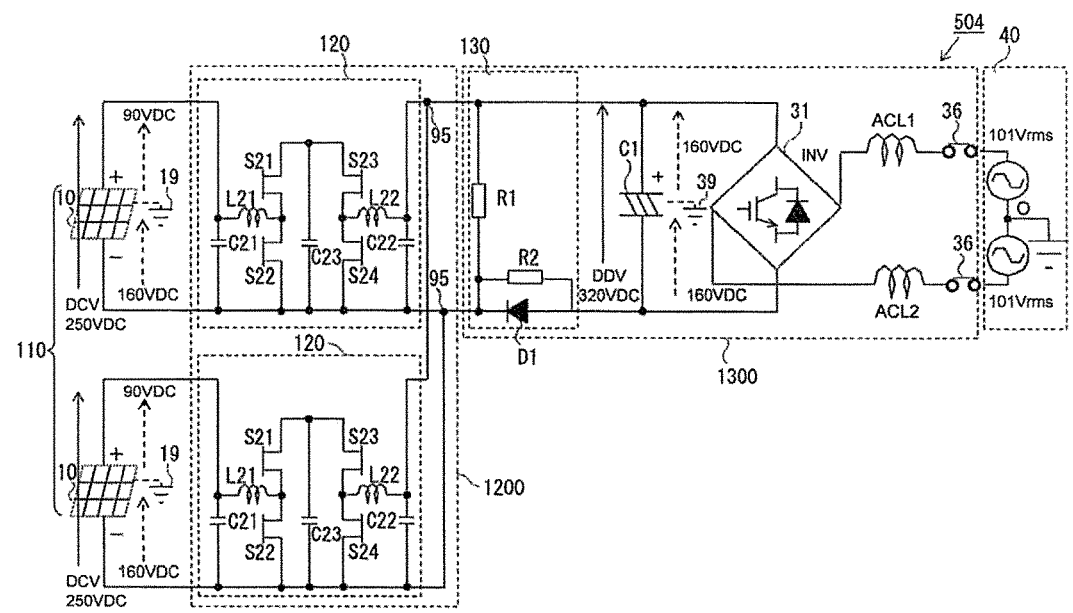
FIG. 39 is a diagram illustrating a circuit configuration of a power supply system according to Modification Example 5-4.

FIG. 39 is a diagram illustrating a circuit configuration of a power supply system 504 according to Modification Example 5-4. Modification Example 5-4 is an example of the DC/DC converter 120 unlike Modification Example 5-2 described above, and is the same as Modification Example 5-2 in other configurations. Therefore, the same elements as those of Modification Example 5-2 described above are denoted with the same reference numerals, and repeated description will be omitted.

In the DC/DC converter 120 of this example, a capacitor C21 is connected between positive and negative electrodes on the input side, and a capacitor C22 is connected between positive and negative electrodes on the output side. In the DC/DC converter 120 of this example, the negative electrode on the input side and the negative electrode on the output side are connected and are in common. Further, one end of a reactor L21 is connected to the positive electrode on the input side, and a switching element S21 and a switching element S22 are connected to the other end of the reactor L21. Similarly, one end of the reactor L22 is connected to the positive electrode on the output side, and a switching element S23 and a switching element S24 are connected to the other end of the reactor L22. An end portion of the switching element S21 on the side opposite to the reactor L21 is connected to an end portion of the switching element S23 on the side opposite to the reactor L22. An end portion of the switching element S22 on the side opposite to the reactor L21 is connected to the negative electrode, and an end portion of the switching element S23 on the side opposite to the reactor L22 is connected to the negative electrode. A capacitor C23 is connected between the switching element S21 and the switching element S22 and between the switching element S23 and the switching element S24.

Thus, since the circuit of the DC/DC converter 120 is configured such that the negative electrode is common, a voltage divided by the potential adjustment device 130 at nighttime is applied to the negative electrode of the solar cell string 10.

Modification Example 5-5

Figure 40:
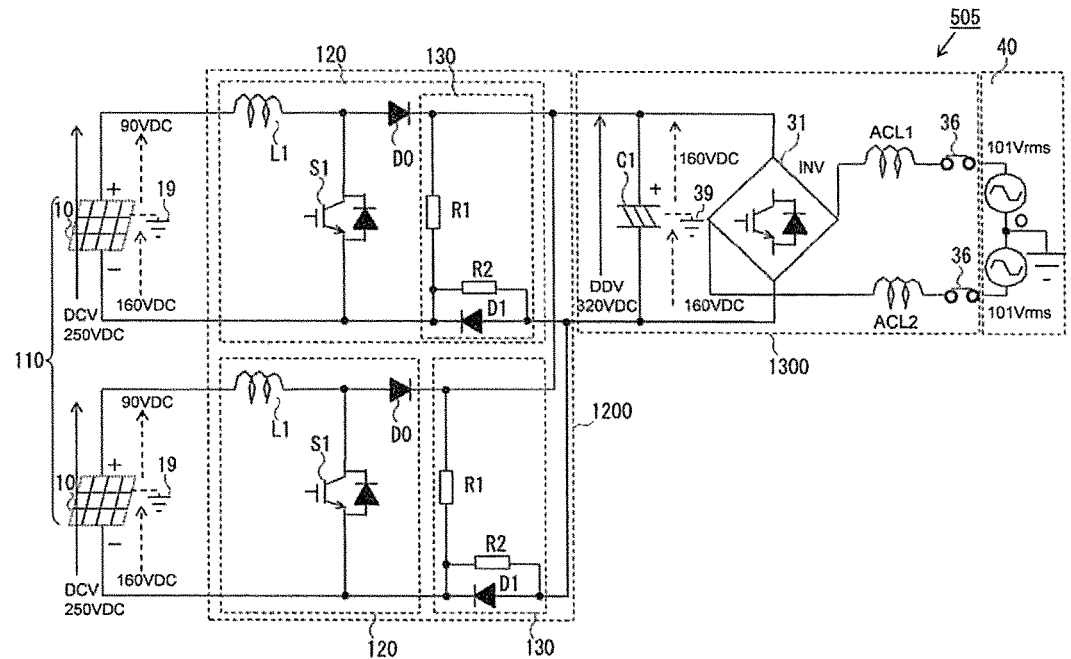
FIG. 40 is a diagram illustrating a circuit configuration of a power supply system according to Modification Example 5-5.

FIG. 40 is a diagram illustrating a circuit configuration of a power supply system 505 according to Modification Example 5-5. This modification example 5-5 is different from Modification Example 5-2 described above in a configuration in which the potential adjustment device is provided in each of the plurality of DC/DC converters 120, and is the same as Modification Example 5-2 in other configurations. Therefore, the same elements as those of Modification Example 5-2 described above are denoted with the same reference numerals, and repeated description will be omitted.

The power supply system 505 of this example sets the voltage DDV between the positive and negative electrodes of the inverter 31 as 320 VDC at daytime, and the ground voltage of the negative electrode in each solar cell string 10 of the solar cell 110 is −160 VDC.

When the inverter 31 is gate-blocked at nighttime, the power supply system 505 of this example applies the voltage DDV between the DC-side positive and negative electrodes of the inverter 31 using the power of the commercial power system via the inverter 31, this voltage DDV is divided by the resistors R1 and R2 of the potential adjustment device 130 provided in each DC/DC converter 120, a voltage is applied to the negative electrode of each solar cell string 10, and the ground potential of the negative electrode is maintained to be positive.

Thus, the power supply system 505 of this example can prevent the progression of performance degradation due to the PID by setting the ground potential of the negative electrode in the plurality of solar cell strings 10 to positive. Further, in the power supply system 505 of this example, since the potential adjustment device 130 is provided in each solar cell string 10, the potential of the negative electrode at nighttime can be appropriately set in each solar cell string 10 even when a solar cell strings 10 having a different configuration is included.

Modification Example 5-6

Figure 41:
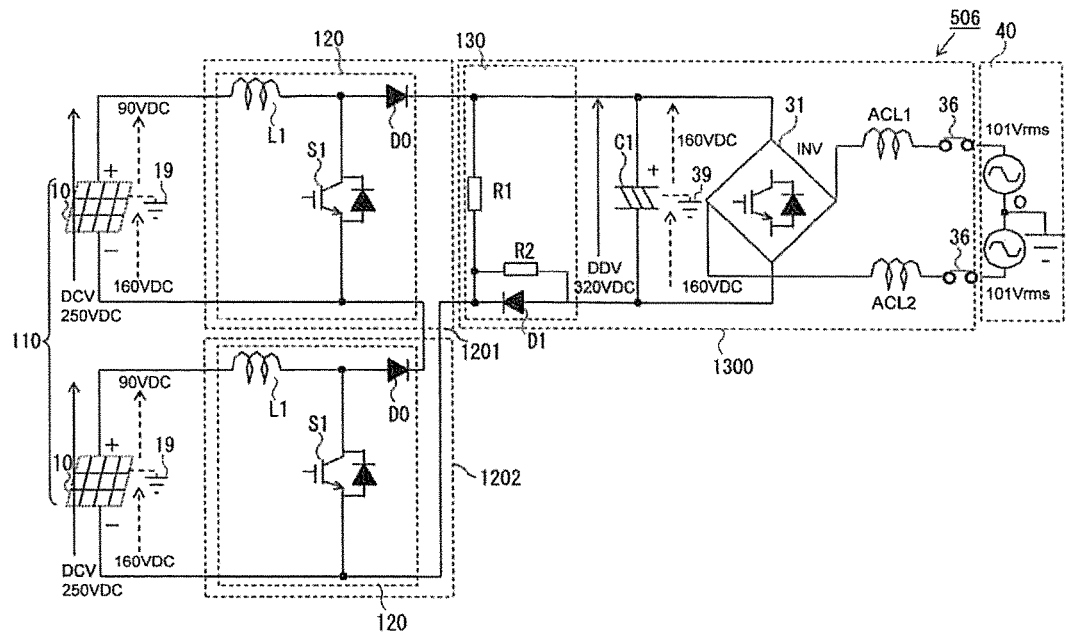
FIG. 41 is a diagram illustrating a circuit configuration of a power supply system according to Modification Example 5-6.

FIG. 41 is a diagram illustrating a circuit configuration of a power supply system 506 according to Modification Example 5-6. This modification example 5-6 is different from Modification Example 5-2 described above in a configuration in which a plurality of module optimizers are connected in series, and is the same as Modification Example 5-2 in other configurations. Therefore, the same elements as those of Modification Example 5-2 described above are denoted with the same reference numerals, and repeated description will be omitted.

In the power supply system 506 of this example, a plurality of module optimizers 1201 and 1202 are connected in series, and a positive electrode on the high potential side and a negative electrode on the low potential side are connected to the positive and negative electrodes of the DD-less inverter.

When the inverter 31 is gate-blocked at nighttime, the power supply system 506 of this example applies the voltage DDV between the DC-side positive and negative electrodes of the inverter 31 using the power of the commercial power system via the inverter 31, this voltage DDV is divided by the resistors R1 and R2 of the potential adjustment device 130 provided in each of the DC/DC converters 120, a voltage is applied to the plurality of module optimizers 1201 and 1202, and the ground potential of the negative electrode of the solar cell string 10 connected to each of the module optimizers 1201 and 1202 is maintained to be positive.

Thus, the power supply system 506 of this example can prevent the progression of performance degradation due to the PID by setting the ground potential of the negative electrode in the plurality of solar cell strings 10 at nighttime to positive in the configuration in which a plurality of module optimizers are connected in series.

Modification Example 5-7

Figure 42:
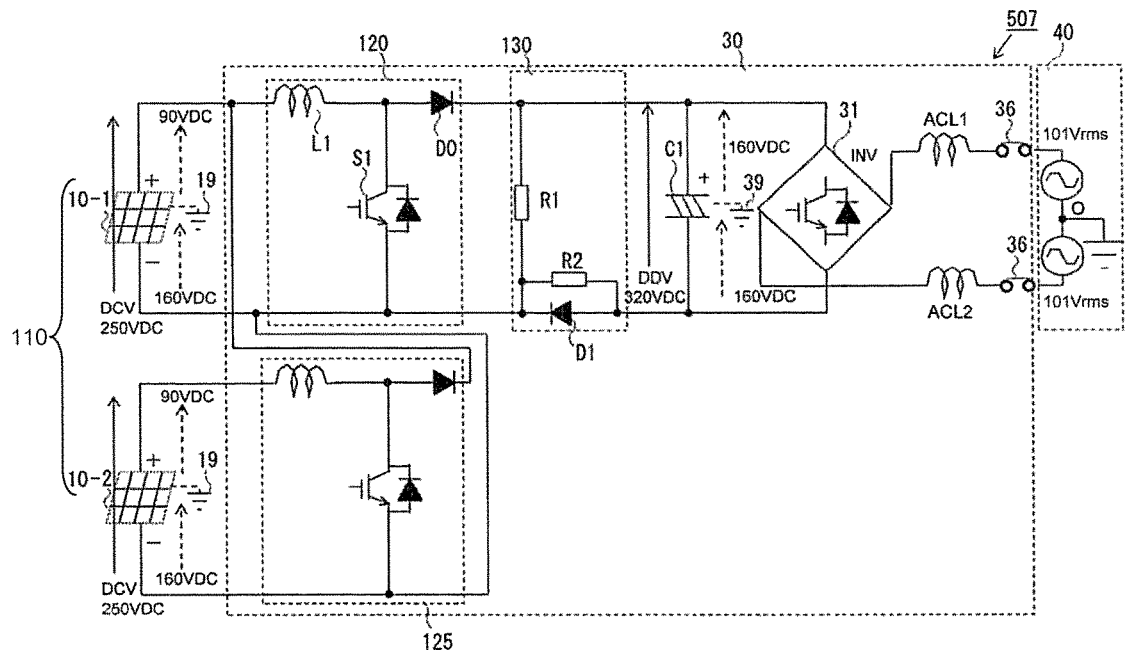
FIG. 42 is a diagram illustrating a circuit configuration of a power supply system according to Modification Example 5-7.

FIG. 42 is a diagram illustrating a circuit configuration of a power supply system 507 according to Modification Example 5-7. This modification example 5-7 is different from Embodiment 5 described above in a configuration in which a boosting unit is included separately from the DC/DC converter 120, and is the same as Embodiment 5 in other configurations. Therefore, the same elements as those of Embodiment 5 described above are denoted with the same reference numerals, and repeated description will be omitted.

The power supply system 507 of this example includes a boosting unit 125 that boosts the output of the solar cell string 10, separately from the common DC/DC converter 120 that converts the output of the plurality of solar cell strings 10 to a predetermined voltage.

Further, the power supply system 507 of this example includes solar cell strings 10-1 and 10-2 with different output powers, as the solar cell strings 10. For example, the solar cell string 10-1 has an output voltage of 250 V and the solar cell string 10-2 has an output voltage of 200 V. The solar cell string 10-2 having the lower output voltage is connected to the boosting unit 125, and an output of the boosting unit 125 is connected to an input of the DC/DC converter 120.

The boosting unit 125 boosts the output voltage (200 VDC) of the solar cell string 10-2 to 250 VDC and inputs the output voltage to the DC/DC converter 120. Accordingly, even in a configuration in which the solar cell strings 10 with different output voltages coexist, the output voltage can be converted to a predetermined voltage by the common DC/DC converter 120.

When the inverter 31 is gate-blocked at nighttime, the power supply system 507 of this example applies the voltage DDV between the DC-side positive and negative electrodes of the inverter 31 using the power of the commercial power system via the inverter 31, this voltage DDV is divided by the resistors R1 and R2 of the potential adjustment device 130, a voltage is applied to the plurality of solar cell strings 10-1 and 10-2, and potentials of the negative electrodes of the respective solar cell strings 10-1 and 10-2 are maintained to be positive.

Thus, the power supply system 507 of this example can prevent the progression of performance degradation due to the PID by setting the ground potential of the negative electrode at nighttime in each of solar cell strings 10-1 and 10-2 to positive in the configuration in which the solar cell strings 10-1 and 10-2 having different output voltages coexist.

Modification Example 5-8

Figure 43:
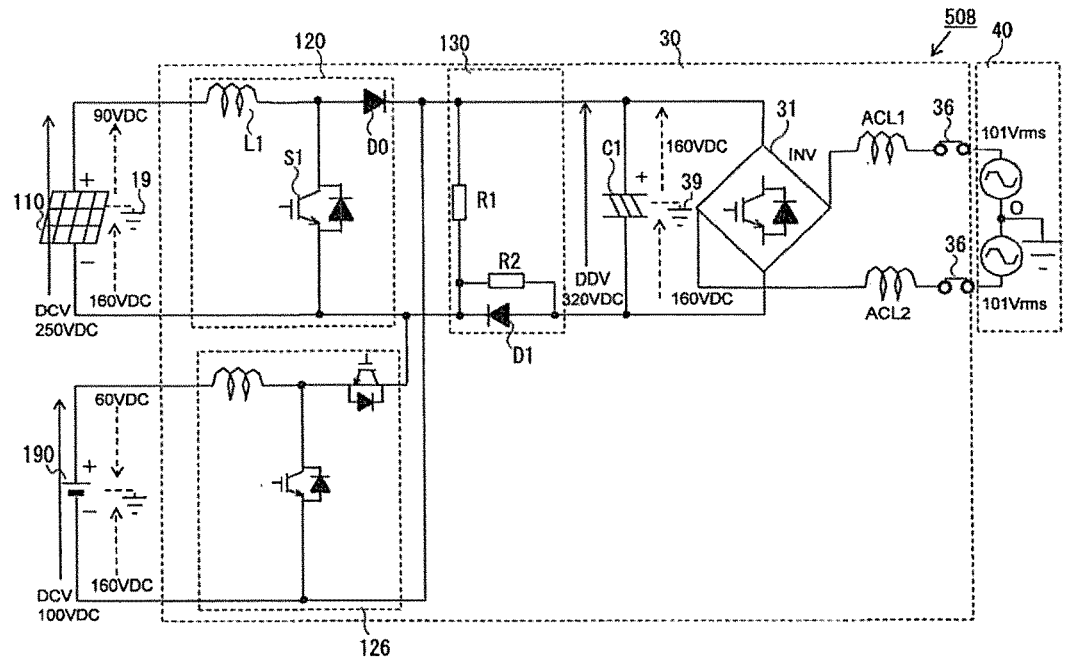
FIG. 43 is a diagram illustrating a circuit configuration of a power supply system according to Modification Example 5-8.
Figure 44:
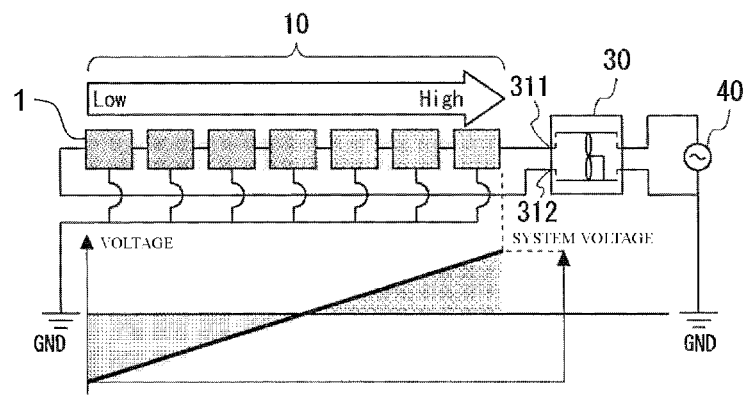
FIG. 44 is a conceptual diagram illustrating an example of a PID phenomenon.

FIG. 43 is a diagram illustrating a circuit configuration of a power supply system 508 according to Modification Example 5-8. This modification example 5-8 is different from embodiment 5 described above in a configuration in which a power supply is included separately from the solar cell 110, and is the same as embodiment 5 in other configurations. Therefore, the same elements as those of Embodiment 5 described above are denoted with the same reference numerals, and repeated description will be omitted.

The power supply system 508 of this example includes a power supply 190 separately from the solar cell 110. A DC output of the power supply 190 is converted into a predetermined voltage by a DC/DC converter 126, input to the inverter 31, converted into an AC voltage by the inverter 31, and output to a distribution board 40. A type of power supply 190 is not particularly limited, and may be a fuel cell, a storage battery, a power generator, a storage battery mounted on an electric vehicle, or the like.

Thus, the power supply system 508 of this example can supply power not only from the solar cell 110 but also from the power supply 190 to a load or the like.

In the power supply system 508 of this example, when power is output from the power supply 190 such as a fuel cell or a storage battery even when the solar cell 110 does not generate power at nighttime or when the AC power of the commercial power system is converted into DC power by the inverter 31 and the storage battery (power supply 190) is charged, the voltage DDV applied between the DC-side positive and negative electrodes of the inverter 31 is divided by the resistors R1 and R2 of the potential adjustment device 130, a voltage is applied to the solar cell 110, and the ground potential of the negative electrode of the solar cell 110 is maintained to be positive. In this case, by increasing the DDV from 320 VDC in FIG. 43 to a high voltage such as 450 VDC, it is possible to further increase the ground potential of the negative electrode of the solar cell 110 and to improve a recovery effect of PID. Further, when the inverter 31 is gate-blocked when power is not output from the power supply 190 at nighttime or when the storage battery (power supply 190) is not charged, the voltage DDV applied between the DC-side positive and negative electrodes of the inverter 31 by the power of the commercial power system via the inverter 31 is divided by the resistors R1 and R2 of the potential adjustment device 130, a voltage is applied to the solar cell 110, and the ground potential of the negative electrode of the solar cell 110 is maintained to be positive.

Thus, the power supply system 508 of this example can prevent the progression of performance degradation due to the PID by setting the ground potential of the negative electrode at nighttime in the solar cell 110 in the configuration in which the other power supply 190 is included.

The embodiments of the disclosure and the modification examples are merely examples, and the disclosure is not limited thereto. Further, the characteristic configurations described in the embodiment and the modification examples described above can naturally be combined without departing from the gist of the disclosure.

What is claimed is:

1. A power supply system, comprising:
a solar cell;
a non-isolated type DC/DC converter, boosting a DC voltage from the solar cell input from an input end with a predetermined boosting ratio and outputting a DC voltage from an output end; and
an inverter, converting the DC voltage output from the output end of the DC/DC converter into an AC voltage, the power supply system being connected to an external power system for system interconnection,
wherein the power supply system comprises a potential adjustment device for applying a voltage of the external power system to the solar cell via the inverter to set a ground potential of a negative electrode of the solar cell to positive when an output of the solar cell is smaller than a predetermined value,
the potential adjustment device includes a first resistor, a second resistor, and a diode,
one end of the first resistor is connected to a positive electrode on a DC side of the inverter, and the other end of the first resistor is connected to a negative electrode of the inverter and the negative electrode of the solar cell,
an anode of the diode is connected to the negative electrode of the inverter, and a cathode of the diode is connected to the negative electrode of the solar cell and one end on a negative electrode side of the first resistor, and
one end of the second resistor is connected to the negative electrode of the inverter, the other end of the second resistor is connected to the negative electrode of the solar cell and one end on the negative electrode side of the first resistor, and the second resistor is connected in parallel to the diode.

2. The power supply system according to claim 1, comprising:
an AC voltage measurement circuit, measuring an AC voltage at an output end of the inverter connected to the power system,
wherein, when the output of the solar cell is smaller than the predetermined value, the voltage of the external power system is applied to the solar cell via the inverter and the AC voltage measurement circuit.

3. The power supply system according to claim 1,
wherein the solar cell comprises a plurality of solar cell strings in which a plurality of solar cell panels are connected in series or in parallel,
a plurality of DC/DC converters respectively connected to the plurality of solar cell strings are included, and
the potential adjustment device is included between output ends of the plurality of DC/DC converters and the inverter.

4. The power supply system according to claim 3, wherein the plurality of DC/DC converters are connected in series.

5. The power supply system according to claim 3, comprising a circuit arrangement in which an output of at least one of the plurality of DC/DC converters is connected to an input of another DC/DC converter.

6. The power supply system according to claim 1,
wherein the solar cell comprises a plurality of solar cell strings in which a plurality of solar cell panels are connected in series or in parallel,
a plurality of DC/DC converters respectively connected to the plurality of solar cell strings are included, and the potential adjustment device is included in each of the plurality of DC/DC converters.

7. The power supply system according to claim 1, comprising a circuit arrangement having a power source different from the solar cell, and an output end of the power source is connected to an input end of the inverter.

8. A power supply system, comprising:
a solar cell;
a non-isolated type DC/DC converter, boosting a DC voltage from the solar cell input from an input end with a predetermined boosting ratio and outputting a DC voltage from an output end;
an inverter, converting the DC voltage output from the output end of the DC/DC converter into an AC voltage, the power supply system being connected to an external power system for system interconnection, wherein the power supply system comprises a potential adjustment device for applying a voltage of the external power system to the solar cell via the inverter to set a ground potential of a negative electrode of the solar cell to positive when an output of the solar cell is smaller than a predetermined value; and
a DC voltage (DCV) detection circuit, connected between the positive electrode and the negative electrode of the solar cell and configured to detect a DC voltage between the positive electrode and the negative electrode,
wherein the potential adjustment device comprises a first resistor between a positive electrode and a negative electrode at a DC-side input end of the inverter, a voltage between the positive electrode and the negative electrode of the DC-side input end of the inverter is divided by the first resistor and the DCV detection circuit when the voltage of the external power system is applied to the solar cell via the inverter, and a resistance value of the DCV detection circuit and a resistance value of the first resistor are set to a predetermined ratio so that a ground voltage at the negative electrode of the solar cell is positive.

9. A power supply system, comprising:
a solar cell;
a non-isolated type DC/DC converter, boosting a DC voltage from the solar cell input from an input end with a predetermined boosting ratio and outputting a DC voltage from an output end; and
an inverter, converting the DC voltage output from the output end of the DC/DC converter into an AC voltage, the power supply system being connected to an external power system for system interconnection,
wherein the power supply system comprises a potential adjustment device for applying a voltage of the external power system to the solar cell via the inverter to set a ground potential of a negative electrode of the solar cell to positive when an output of the solar cell is smaller than a predetermined value,
the potential adjustment device includes a switching device and a diode,
one end of the switching device is connected to the positive electrode at the output end of the DC/DC converter, the other end of the switching device is connected to the negative electrode at the output end of the DC/DC converter, and both of the ends are switched between conduction and non-conduction,
an anode of the diode is connected to a negative electrode of the inverter, and a cathode of the diode is connected to the negative electrode of the solar cell and one end on a negative electrode side of the switching device, and
the switching device causes the positive and negative electrodes at the output end of the DC/DC converter to be conductive when the output of the solar cell is smaller than the predetermined value, and the switching device causes the positive and negative electrodes at the output end of the DC/DC converter to be non-conductive when the output of the solar cell is not smaller than the predetermined value.

10. A power supply system, comprising:
a solar cell;
a non-isolated type DC/DC converter, boosting a DC voltage from the solar cell input from an input end with a predetermined boosting ratio and outputting a DC voltage from an output end;
an inverter, converting the DC voltage output from the output end of the DC/DC converter into an AC voltage, the power supply system being connected to an external power system for system interconnection, wherein the power supply system comprises a potential adjustment device for applying a voltage of the external power system to the solar cell via the inverter to set a ground potential of a negative electrode of the solar cell to positive when an output of the solar cell is smaller than a predetermined value; and
an AC voltage measurement circuit, measuring an AC voltage at an output end of the inverter connected to the power system,
wherein, when the output of the solar cell is smaller than the predetermined value, the voltage of the external power system is applied to the solar cell via the inverter and the AC voltage measurement circuit,
the potential adjustment device includes a first resistor, a second resistor, a third resistor, and a diode,
one end of the first resistor is connected to the positive electrode on a DC side of the inverter, and the other end of the first resistor is connected to a negative electrode of the inverter and the negative electrode of the solar cell,
an anode of the diode is connected to the negative electrode of the inverter, and a cathode of the diode is connected to the negative electrode of the solar cell and one end on a negative electrode side of the first resistor,
one end of the second resistor is connected to the negative electrode of the inverter, the other end of the second resistor is connected to the negative electrode of the solar cell and one end on the negative electrode side of the first resistor, and the second resistor is connected in parallel to the diode, and
one end of the third resistor is connected to a zero phase of the inverter, and the other end of the third resistor is connected to the positive electrode on the DC side of the inverter.

11. A power supply system, comprising:
a solar cell;
a non-isolated type DC/DC converter, boosting a DC voltage from the solar cell input from an input end with a predetermined boosting ratio and outputting a DC voltage from an output end; and
an inverter, converting the DC voltage output from the output end of the DC/DC converter into an AC voltage, the power supply system being connected to an external power system for system interconnection,
wherein the power supply system comprises a potential adjustment device for applying a voltage of the external power system to the solar cell via the inverter to set a ground potential of a negative electrode of the solar cell to positive when an output of the solar cell is smaller than a predetermined value, the potential adjustment device includes a first resistor, a second resistor, and a switching device, one end of the first resistor is connected to the positive electrode on a DC side of the inverter, and the other end of the first resistor is connected to a negative electrode of the inverter and the negative electrode of the solar cell, one end of the switching device is connected to the negative electrode of the inverter, and the other end of the switching device is connected to the negative electrode of the solar cell and one end on a negative electrode side of the first resistor, and one end of the second resistor is connected to the negative electrode of the inverter, the other end of the second resistor is connected to the negative electrode of the solar cell and the end on the negative electrode side of the first resistor, and the second resistor is connected in parallel to the switching device.

12. The power supply system according to claim 11, wherein the switching device is a MOSFET or a relay.

13. A power supply system, comprising:
a solar cell;
a non-isolated type DC/DC converter, boosting a DC voltage from the solar cell input from an input end with a predetermined boosting ratio and outputting a DC voltage from an output end; and
an inverter, converting the DC voltage output from the output end of the DC/DC converter into an AC voltage, the power supply system being connected to an external power system for system interconnection,
wherein the power supply system comprises a potential adjustment device for applying a voltage of the external power system to the solar cell via the inverter to set a ground potential of a negative electrode of the solar cell to positive when an output of the solar cell is smaller than a predetermined value,
the potential adjustment device includes a first resistor, a second resistor, and a three-terminal relay,
one end of the first resistor is connected to the positive electrode on a DC side of the inverter, and the other end of the first resistor is connected to a first terminal of the three-terminal relay,
one end of the second resistor is connected to the negative electrode of the inverter and a second terminal of the three-terminal relay, and the other end of the second resistor is connected to the first terminal of the three-terminal relay,
a common terminal of the three-terminal relay is connected to the negative electrode of the solar cell,
in the three-terminal relay, the negative electrode of the solar cell and the negative electrode at the output end of the DC/DC converter are connected during the daytime, and
the three-terminal relay causes the negative electrode of the solar cell and the first terminal to be conductive when the output of the solar cell is not smaller than the predetermined value, and the three-terminal relay causes the negative electrode of the solar cell and the second terminal to be conductive when the output of the solar cell is smaller than the predetermined value.

14. A power supply system, comprising:
a solar cell;
a non-isolated type DC/DC converter, boosting a DC voltage from the solar cell input from an input end with a predetermined boosting ratio and outputting a DC voltage from an output end; and
an inverter, converting the DC voltage output from the output end of the DC/DC converter into an AC voltage, the power supply system being connected to an external power system for system interconnection,
wherein the power supply system comprises a potential adjustment device for applying a voltage of the external power system to the solar cell via the inverter to set a ground potential of a negative electrode of the solar cell to positive when an output of the solar cell is smaller than a predetermined value,
the potential adjustment device includes a first resistor, a second resistor, and a disconnection device,
the first resistor and the second resistor are connected in series between a positive electrode and a negative electrode on a DC side of the inverter,
the disconnection device electrically disconnecting the solar cell from the input end of the DC/DC converter is included between the positive electrode of the solar cell and the positive electrode at the input end of the DC/DC converter and between the negative electrode of the solar cell and the negative electrode at the input end of the DC/DC converter, and
a portion between the first resistor and the second resistor and a portion of the negative electrode of the solar cell separated by the disconnection device are connected to a solar cell side.

* * * * *